(12) United States Patent
Bone et al.

(10) Patent No.: US 12,436,363 B2
(45) Date of Patent: Oct. 7, 2025

(54) OPTICAL IMAGING LENS

(71) Applicant: GENIUS ELECTRONIC OPTICAL (XIAMEN) CO., LTD., Fujian (CN)

(72) Inventors: Matthew Bone, Fujian (CN); Qingzhi Zhu, Fujian (CN); Songchao Huang, Fujian (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 778 days.

(21) Appl. No.: 17/699,199

(22) Filed: Mar. 21, 2022

(65) Prior Publication Data

US 2023/0273401 A1    Aug. 31, 2023

(30) Foreign Application Priority Data

Feb. 25, 2022 (CN) .......................... 202210180570.8

(51) Int. Cl.
G02B 9/34 (2006.01)
G02B 1/00 (2006.01)
G02B 13/00 (2006.01)

(52) U.S. Cl.
CPC .............. *G02B 9/34* (2013.01); *G02B 1/00* (2013.01); *G02B 13/004* (2013.01)

(58) Field of Classification Search
CPC .......... G02B 9/34; G02B 1/00; G02B 13/004; G02B 13/06; G02B 3/04
(Continued)

(56) References Cited

U.S. PATENT DOCUMENTS 8,014,080 B1 * 9/2011 Chen ........................ G02B 9/34
                                                                 359/650
10,768,394 B2   9/2020 Chen et al.
(Continued)

FOREIGN PATENT DOCUMENTS

CN            105372787            3/2016
CN            111239987            6/2020
(Continued)

OTHER PUBLICATIONS

Alex Ning, Plastic vs. Glass Optics: Factors to Consider, 1998, pp. 1-10, [retrieved Jul. 10, 2023], (Year: 1998).*
Herbert Gross (ed.), Handbook of Optical Systems, vol. 3: Aberration Theory and Correction of Optical Systems 377-379 (2007). (Year: 2007).*
(Continued)

*Primary Examiner* — James R Greece
(74) *Attorney, Agent, or Firm* — JCIPRNET

(57) ABSTRACT

An optical imaging lens, sequentially including a first, second, third, and fourth lens elements along an optical axis from an object side to an image side, is provided. Each of the first to fourth lens elements includes an object-side surface facing the object side and allowing imaging rays to pass through, and an image-side surface facing the image side and allowing the imaging rays to pass through. An optical axis region of the object-side surface of the first lens element is convex. The second lens element is a glass lens element. The third lens element has negative refracting power. An optical axis region of the image-side surface of the fourth lens element is convex. Lens elements of the optical imaging lens are only the four lens elements, and the optical imaging lens further satisfies following conditional expressions: HFOV/TTL≥15.000 degrees/mm and 0.500≤|RLGmin|/TG.

19 Claims, 36 Drawing Sheets

(58) Field of Classification Search
USPC .................................................. 359/708, 715
See application file for complete search history.

(56) References Cited

U.S. PATENT DOCUMENTS

| | | | |
|---|---|---|---|
| 2020/0209524 A1* | 7/2020 | Chen ........................ | G02B 9/34 |
| 2020/0326517 A1* | 10/2020 | Hsieh ....................... | G02B 9/36 |
| 2022/0252833 A1* | 8/2022 | Hsieh ....................... | G02B 9/34 |
| 2023/0273405 A1* | 8/2023 | Bone ........................ | G02B 3/04 |
| | | | 359/715 |

FOREIGN PATENT DOCUMENTS

| | | | | |
|---|---|---|---|---|
| CN | 111708151 | | 9/2020 | |
| CN | 112034597 | | 12/2020 | |
| CN | 112799217 A | * | 5/2021 | ........... G02B 13/004 |
| CN | 113031226 | | 6/2021 | |
| TW | I468773 | | 1/2015 | |

OTHER PUBLICATIONS

Simon Thibault et al., Consumer Electronic Optics: How Small a Lens Can Be? The Case of Panomorph Lenses, 9192 Proceedings of SPIE 91920H-1 to 91920H-7 (2014). (Year: 2014).*

Focal Lengths, Apertures and F/Nos., 2016, pp. 1-2 [online], [retrieved May 3, 2023], retrieved from the Internet <URL: https://spacemath.gsfc.nasa.gov/weekly/10Page30.pdf>. (Year: 2016).*

Andy Rowlands, Physics of Digital Photography, Chapter 1, 2017, pp. 1-1 to 1-62 [online], [retrieved Nov. 2, 2023], retrieved from the Internet <URL: https://iopscience.iop.org/book/mono/978-0-7503-1242-4/chapter/bk978-0-7503-1242-4ch1.pdf>. (Year: 2017).*

Machine English Translation obtained from Patent Translate for CN 111708151 A, filed with CN 111708151 A. (Year: 2024).*

Machine English Translation obtained from Patent Translate for CN 111239987 A, filed with CN 111239987 A. (Year: 2024).*

"Office Action of Taiwan Counterpart Application", issued on Aug. 30, 2023, pp. 1-7.

"Office Action of China Counterpart Application", issued on Feb. 26, 2024, p. 1-p. 7.

* cited by examiner

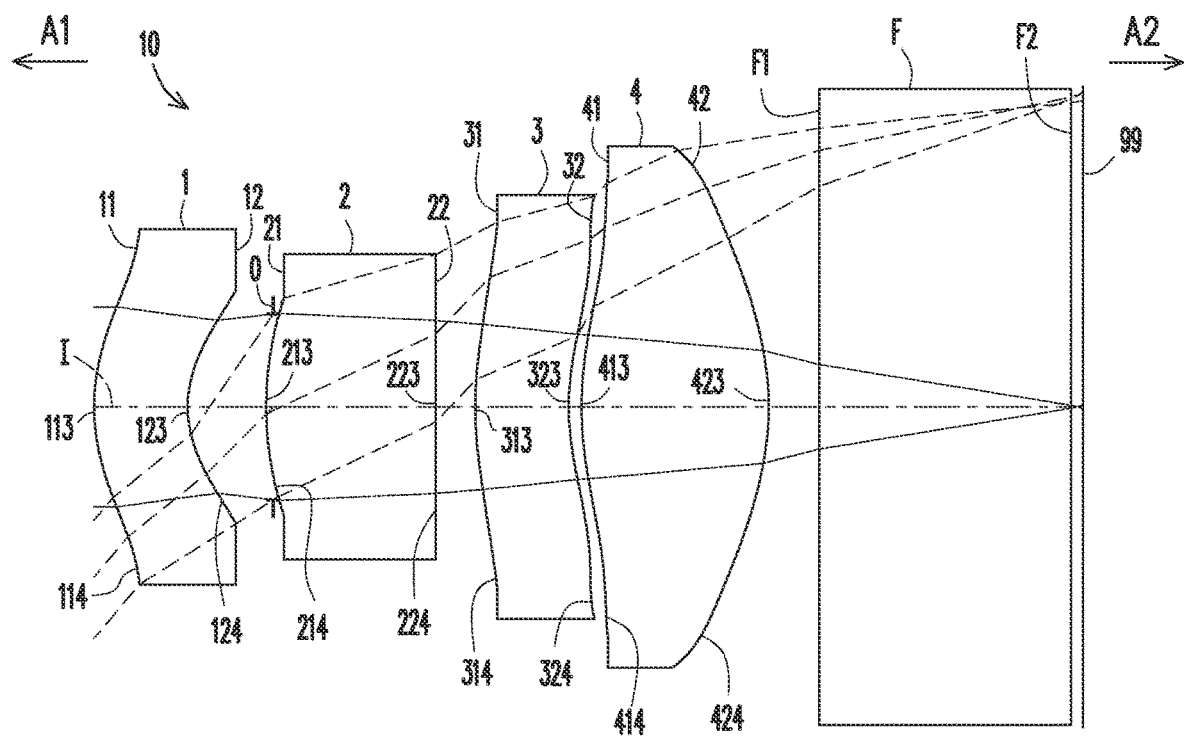
FIG. 6
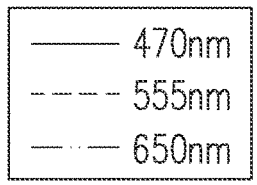
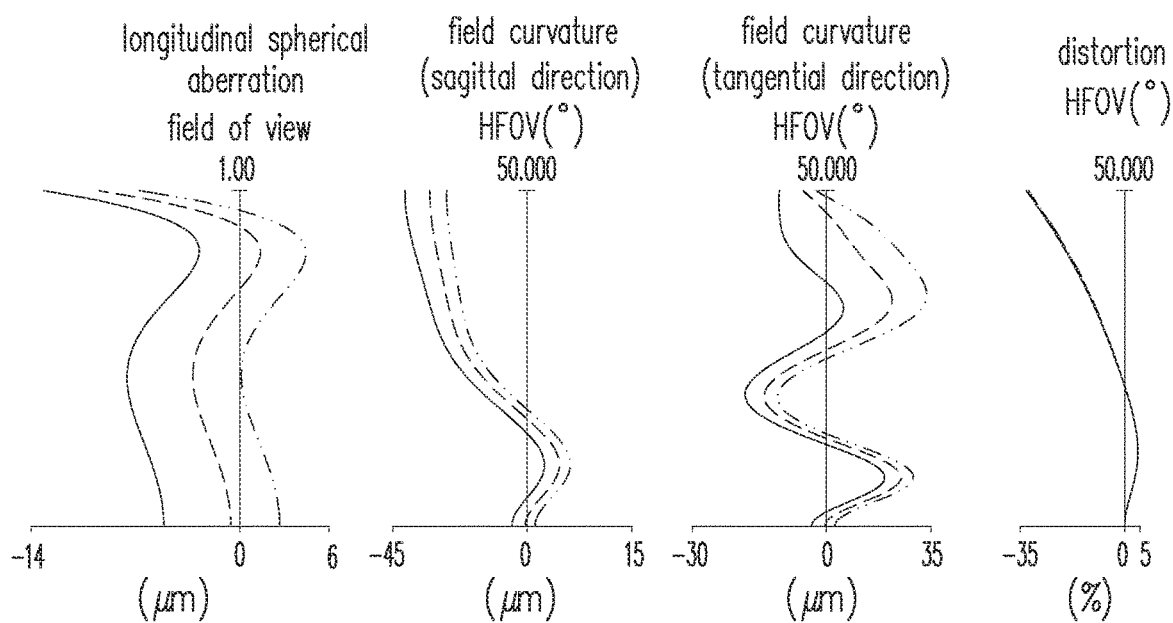
FIG. 7A     FIG. 7B     FIG. 7C     FIG. 7D

| First embodiment |||||||
|---|---|---|---|---|---|---|
| EFL = 0.622 mm, HFOV = 50.000 degrees, TTL = 1.574 mm, Fno = 2.000, ImgH = 0.500 mm |||||||
| Element | Surface | Radius of curvature (mm) | Thickness (mm) | Refractive index | Abbe number | Focal length (mm) |
| Object | | Infinity | Infinity | | | |
| First lens element 1 | Object-side surface 11 | 0.327 | 0.149 | 1.545 | 55.987 | -1.183 |
| | Image-side surface 12 | 0.182 | 0.136 | | | |
| Aperture 0 | | Infinity | -0.011 | | | |
| Second lens element 2 | Object-side surface 21 | 0.544 | 0.270 | 1.693 | 52.931 | 0.783 |
| | Image-side surface 22 | Infinity | 0.063 | | | |
| Third lens element 3 | Object-side surface 31 | 0.574 | 0.149 | 1.661 | 20.373 | -2.590 |
| | Image-side surface 32 | 0.386 | 0.020 | | | |
| Fourth lens element 4 | Object-side surface 41 | 0.548 | 0.298 | 1.545 | 55.987 | 0.479 |
| | Image-side surface 42 | -0.404 | 0.080 | | | |
| Filter F | Object-side surface F1 | Infinity | 0.400 | 1.517 | 64.167 | |
| | Image-side surface F2 | Infinity | 0.019 | | | |
| | Image plane 99 | Infinity | | | | |

FIG. 8

| Surface | K | $a_4$ | $a_6$ | $a_8$ |
|---|---|---|---|---|
| 11 | -9.553269E-01 | -2.444608E+00 | -1.211685E+02 | 6.447504E+02 |
| 12 | -2.843927E-01 | -2.744768E+01 | -3.218690E+01 | -1.075832E+04 |
| 31 | -1.954595E+00 | -1.157617E+01 | 1.360805E+02 | -6.685469E+02 |
| 32 | -1.059886E+01 | -2.420339E+00 | -5.525684E+01 | 4.677076E+02 |
| 41 | -1.483573E+00 | -5.920216E+00 | 7.511829E-01 | 9.381254E+01 |
| 42 | -1.911176E+01 | -8.360391E+00 | 8.349246E+01 | -2.886541E+02 |

FIG. 9

| Second embodiment | | | | | | |
|---|---|---|---|---|---|---|
| EFL = 0.657 mm, HFOV = 50.000 degrees, TTL = 1.882 mm, Fno = 2.000, ImgH = 0.452 mm | | | | | | |
| Element | Surface | Radius of curvature (mm) | Thickness (mm) | Refractive index | Abbe number | Focal length (mm) |
| Object | | Infinity | Infinity | | | |
| First lens element 1 | Object-side surface 11 | 0.341 | 0.176 | 1.545 | 55.987 | -0.995 |
| | Image-side surface 12 | 0.171 | 0.147 | | | |
| Aperture 0 | | Infinity | 0.005 | | | |
| Second lens element 2 | Object-side surface 21 | 1.556 | 0.270 | 1.545 | 55.987 | 0.474 |
| | Image-side surface 22 | -0.292 | 0.030 | | | |
| Third lens element 3 | Object-side surface 31 | -2.334 | 0.150 | 1.661 | 20.373 | -1.059 |
| | Image-side surface 32 | 1.039 | 0.058 | | | |
| Fourth lens element 4 | Object-side surface 41 | Infinity | 0.368 | 1.693 | 52.931 | 0.775 |
| | Image-side surface 42 | -0.539 | 0.080 | | | |
| Filter F | Object-side surface F1 | Infinity | 0.400 | 1.517 | 64.167 | |
| | Image-side surface F2 | Infinity | 0.198 | | | |
| | Image plane 99 | Infinity | | | | |

FIG. 12

| Surface | K | $a_4$ | $a_6$ | $a_8$ |
|---|---|---|---|---|
| 11 | -3.269313E-01 | -4.535180E+00 | -6.550930E+01 | 2.211849E+02 |
| 12 | -4.120357E-01 | -9.553632E+00 | -3.774789E+02 | -4.051013E+01 |
| 21 | 0.000000E+00 | 7.698049E-01 | -4.197308E+01 | -1.240018E+03 |
| 22 | 0.000000E+00 | 3.269760E+00 | 2.462624E+01 | -7.667260E+02 |
| 31 | 1.458617E+01 | -4.186994E+00 | 3.185693E+01 | -8.860098E+02 |
| 32 | -3.150361E+01 | -6.280590E-01 | 3.132068E+00 | -5.572286E+00 |

FIG. 13

| Third embodiment | | | | | | |
|---|---|---|---|---|---|---|
| EFL = 0.295 mm, HFOV = 50.000 degrees, TTL = 1.837 mm, Fno = 2.000, ImgH = 0.494 mm | | | | | | |
| Element | Surface | Radius of curvature (mm) | Thickness (mm) | Refractive index | Abbe number | Focal length (mm) |
| Object | | Infinity | Infinity | | | |
| First lens element 1 | Object-side surface 11 | 16.334 | 0.150 | 1.545 | 55.987 | -1.045 |
| | Image-side surface 12 | 0.550 | 0.121 | | | |
| Aperture 0 | | Infinity | 0.009 | | | |
| Second lens element 2 | Object-side surface 21 | Infinity | 0.402 | 1.693 | 52.931 | 0.371 |
| | Image-side surface 22 | -0.258 | 0.024 | | | |
| Third lens element 3 | Object-side surface 31 | -0.681 | 0.148 | 1.661 | 20.373 | -0.382 |
| | Image-side surface 32 | 0.443 | 0.014 | | | |
| Fourth lens element 4 | Object-side surface 41 | -45.308 | 0.461 | 1.545 | 55.987 | 0.340 |
| | Image-side surface 42 | -0.185 | 0.080 | | | |
| Filter F | Object-side surface F1 | Infinity | 0.400 | 1.517 | 64.167 | |
| | Image-side surface F2 | Infinity | 0.028 | | | |
| | Image plane 99 | Infinity | | | | |

FIG. 16

| Surface | K | $a_4$ | $a_6$ | $a_8$ |
|---|---|---|---|---|
| 11 | -9.563568E+01 | 1.783744E+00 | 2.228901E+01 | -6.225455E+01 |
| 12 | 4.944373E-01 | -1.511037E+01 | 6.138241E+02 | -4.802148E+03 |
| 31 | 8.244733E+00 | -7.433788E+01 | 1.300553E+03 | -6.998622E+03 |
| 32 | -4.743272E+01 | -1.932131E+01 | 2.178779E+02 | -8.007825E+02 |
| 41 | -9.542887E+01 | 4.016365E+00 | 2.384254E-01 | -4.344978E+01 |
| 42 | -2.316251E+00 | -9.315485E+00 | 1.062472E+02 | -2.688875E+02 |

FIG. 17

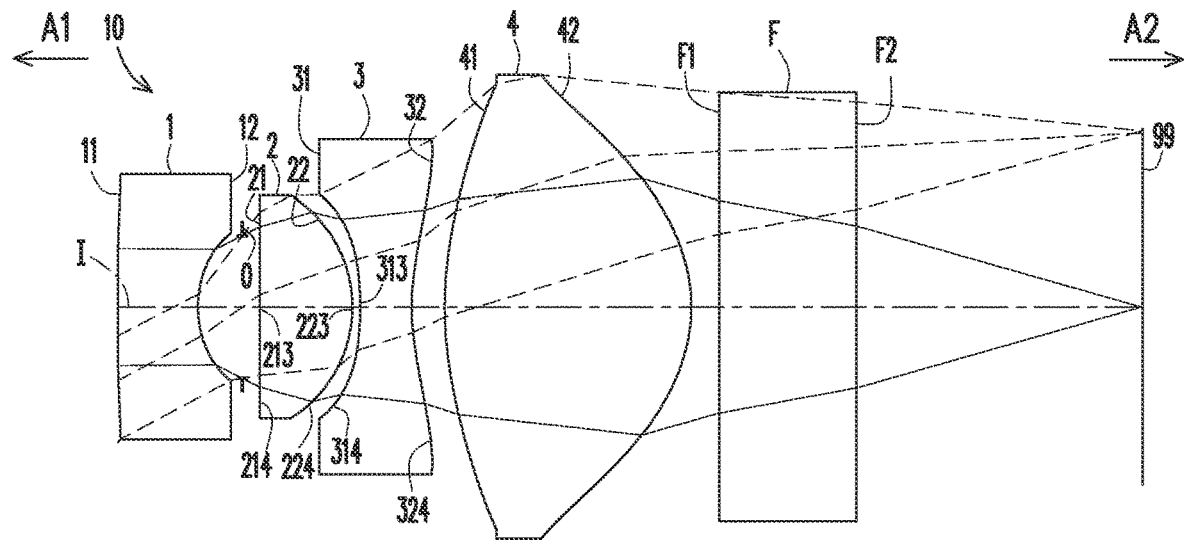
FIG. 18
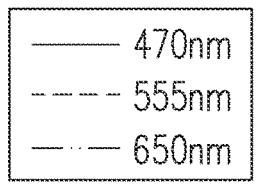
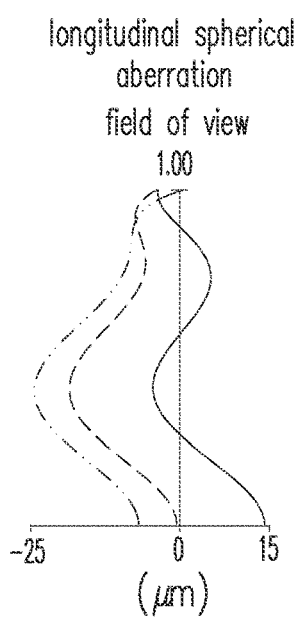
FIG. 19A
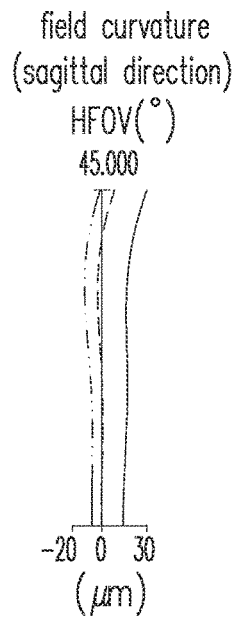
FIG. 19B
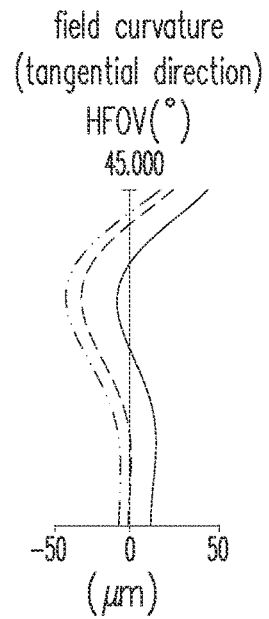
FIG. 19C
FIG. 19D

| Fourth embodiment | | | | | | |
|---|---|---|---|---|---|---|
| EFL = 0.615 mm, HFOV = 45.000 degrees, TTL = 2.978 mm, Fno = 1.800, ImgH = 0.504 mm | | | | | | |
| Element | Surface | Radius of curvature (mm) | Thickness (mm) | Refractive index | Abbe number | Focal length (mm) |
| Object | | Infinity | Infinity | | | |
| First lens element 1 | Object-side surface 11 | 90.000 | 0.234 | 1.545 | 55.987 | -0.593 |
| | Image-side surface 12 | 0.322 | 0.129 | | | |
| Aperture 0 | | Infinity | 0.050 | | | |
| Second lens element 2 | Object-side surface 21 | Infinity | 0.270 | 1.693 | 52.931 | 0.550 |
| | Image-side surface 22 | -0.382 | 0.023 | | | |
| Third lens element 3 | Object-side surface 31 | -1.053 | 0.149 | 1.661 | 20.373 | -0.577 |
| | Image-side surface 32 | 0.641 | 0.096 | | | |
| Fourth lens element 4 | Object-side surface 41 | 1.057 | 0.715 | 1.545 | 55.987 | 0.725 |
| | Image-side surface 42 | -0.482 | 0.080 | | | |
| Filter F | Object-side surface F1 | Infinity | 0.400 | 1.517 | 64.167 | |
| | Image-side surface F2 | Infinity | 0.832 | | | |
| | Image plane 99 | Infinity | | | | |

FIG. 20

| Surface | K | $a_4$ | $a_6$ | $a_8$ |
|---|---|---|---|---|
| 11 | 9.469702E+01 | 1.603369E+00 | -1.358595E+01 | 3.495444E+01 |
| 12 | 9.643636E-01 | -1.659853E+00 | 8.881670E+01 | -3.177309E+03 |
| 31 | 8.387517E+00 | -6.256885E+00 | 4.157602E+01 | -1.754643E+02 |
| 32 | -1.883941E+01 | -8.369766E-02 | -1.106924E+00 | -2.346366E+00 |
| 41 | -1.463119E+01 | 3.991392E-01 | -9.027819E-01 | 1.064563E+00 |
| 42 | -1.691287E+00 | -5.718418E-01 | -7.126577E-01 | 2.883343E+00 |

FIG. 21

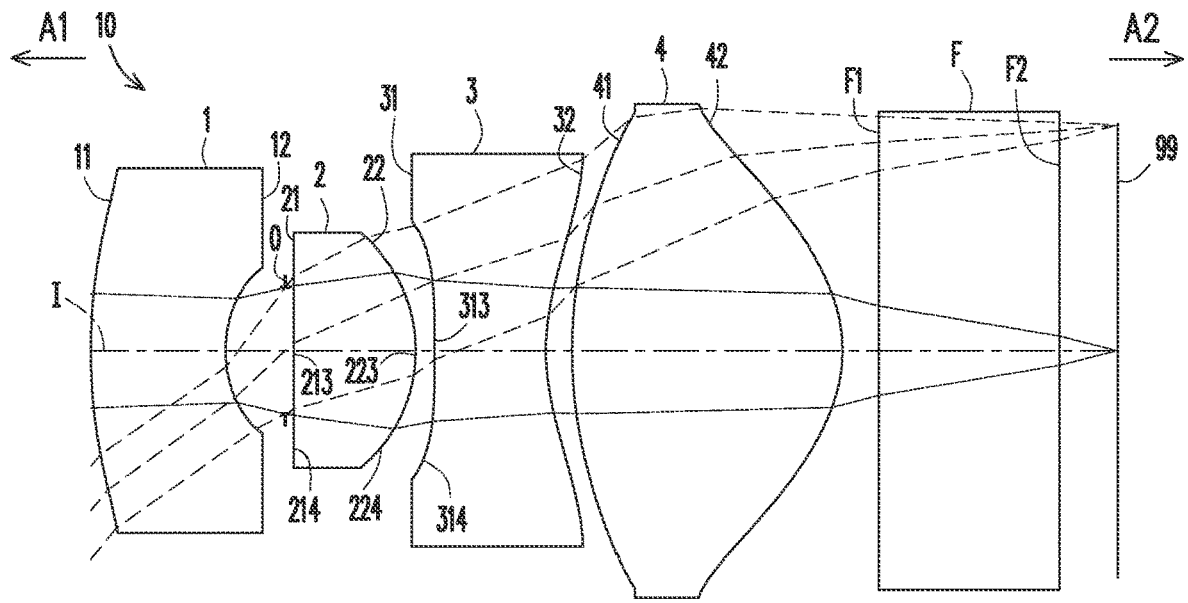
FIG. 22
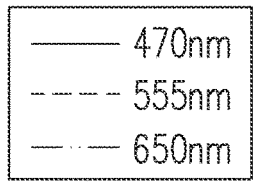
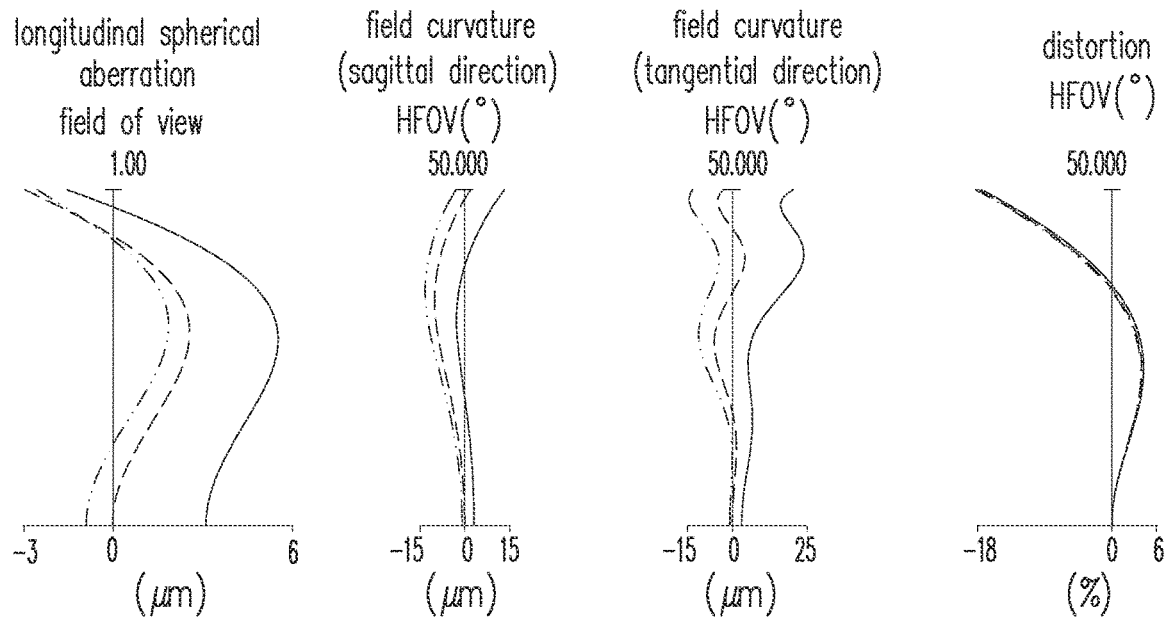
FIG. 23A  FIG. 23B  FIG. 23C  FIG. 23D

| Fifth embodiment ||||||||
|---|---|---|---|---|---|---|
| EFL = 0.511 mm, HFOV = 50.000 degrees, TTL = 2.276 mm, Fno = 2.000, ImgH = 0.500 mm ||||||||
| Element | Surface | Radius of curvature (mm) | Thickness (mm) | Refractive index | Abbe number | Focal length (mm) |
| Object |  | Infinity | Infinity |  |  |  |
| First lens element 1 | Object-side surface 11 | 1.288 | 0.299 | 1.545 | 55.987 | -0.749 |
|  | Image-side surface 12 | 0.285 | 0.132 |  |  |  |
| Aperture 0 |  | Infinity | 0.018 |  |  |  |
| Second lens element 2 | Object-side surface 21 | Infinity | 0.270 | 1.693 | 52.931 | 0.487 |
|  | Image-side surface 22 | -0.339 | 0.042 |  |  |  |
| Third lens element 3 | Object-side surface 31 | -8.897 | 0.247 | 1.661 | 20.373 | -0.693 |
|  | Image-side surface 32 | 0.493 | 0.058 |  |  |  |
| Fourth lens element 4 | Object-side surface 41 | 1.021 | 0.599 | 1.545 | 55.987 | 0.541 |
|  | Image-side surface 42 | -0.330 | 0.080 |  |  |  |
| Filter F | Object-side surface F1 | Infinity | 0.400 | 1.517 | 64.167 |  |
|  | Image-side surface F2 | Infinity | 0.129 |  |  |  |
|  | Image plane 99 | Infinity |  |  |  |  |

FIG. 24

| Surface | K | $a_4$ | $a_6$ | $a_8$ |
|---|---|---|---|---|
| 11 | 9.152524E-01 | 6.783937E-01 | -7.416683E+00 | 1.080145E+01 |
| 12 | 1.037742E+00 | 5.852418E-01 | -5.136519E+01 | -1.444183E+03 |
| 31 | 9.413697E+01 | -6.843576E+00 | 2.277760E+01 | -2.755492E+02 |
| 32 | -5.519748E+00 | -1.123508E+00 | 6.758981E-01 | -3.803015E+00 |
| 41 | -2.332324E+00 | 2.997931E-01 | -2.074645E+00 | 5.573293E+00 |
| 42 | -1.825813E+00 | -5.415130E-01 | -1.576854E+00 | 1.171275E+01 |

FIG. 25

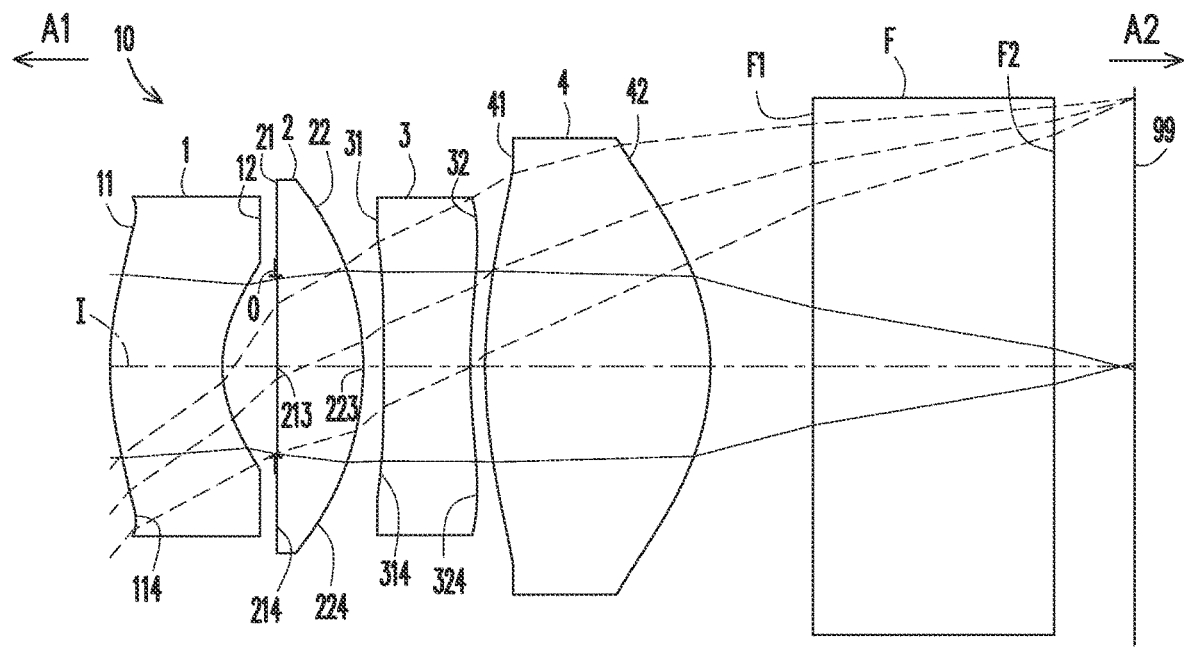
FIG. 26
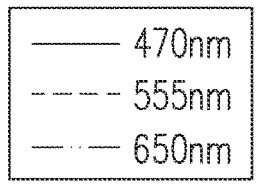
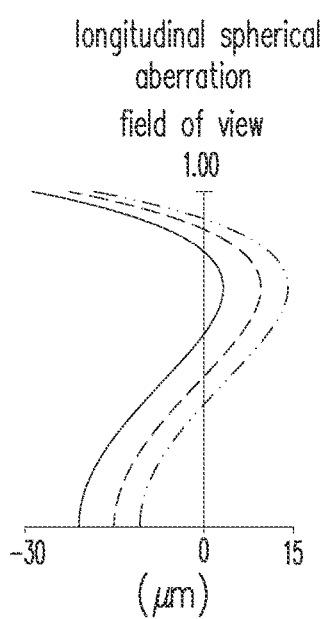
FIG. 27A
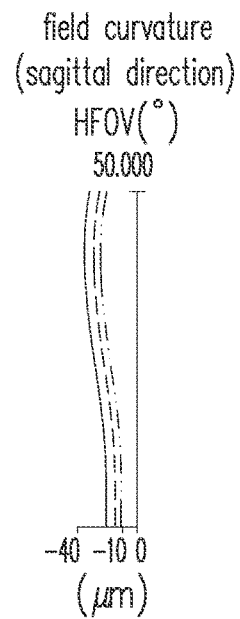
FIG. 27B
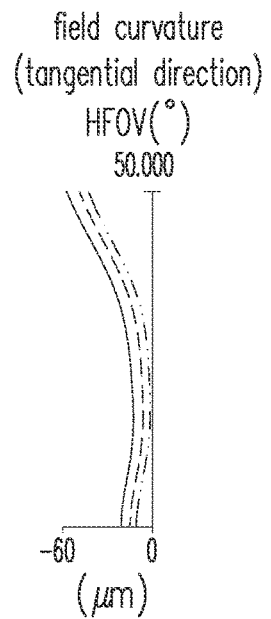
FIG. 27C
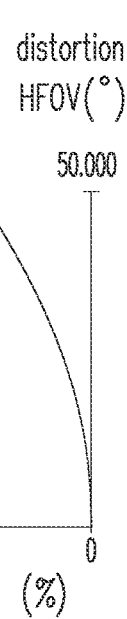
FIG. 27D

| Sixth embodiment ||||||| 
|---|---|---|---|---|---|---|
| EFL = 0.601 mm, HFOV = 50.000 degrees, TTL = 1.702 mm, Fno = 2.000, ImgH = 0.445 mm |||||||
| Element | Surface | Radius of curvature (mm) | Thickness (mm) | Refractive index | Abbe number | Focal length (mm) |
| Object | | Infinity | Infinity | | | |
| First lens element 1 | Object-side surface 11 | 0.496 | 0.187 | 1.545 | 55.987 | -0.891 |
| | Image-side surface 12 | 0.213 | 0.088 | | | |
| Aperture 0 | | Infinity | 0.003 | | | |
| Second lens element 2 | Object-side surface 21 | -19.942 | 0.143 | 1.693 | 52.931 | 0.710 |
| | Image-side surface 22 | -0.483 | 0.034 | | | |
| Third lens element 3 | Object-side surface 31 | 18.962 | 0.144 | 1.567 | 37.533 | -1.663 |
| | Image-side surface 32 | 0.900 | 0.025 | | | |
| Fourth lens element 4 | Object-side surface 41 | 0.850 | 0.374 | 1.545 | 55.987 | 0.561 |
| | Image-side surface 42 | -0.404 | 0.170 | | | |
| Filter F | Object-side surface F1 | Infinity | 0.400 | 1.517 | 64.167 | |
| | Image-side surface F2 | Infinity | 0.135 | | | |
| | Image plane 99 | Infinity | | | | |

FIG. 28

| Surface | K | $a_4$ | $a_6$ | $a_8$ |
|---|---|---|---|---|
| 11 | -1.859209E+00 | -3.381192E+00 | -4.481591E+01 | 1.587968E+02 |
| 12 | -1.028984E+00 | -2.882174E+00 | -2.248497E+01 | -5.013595E+03 |
| 31 | 5.000276E+01 | -8.572210E+00 | 8.973163E+01 | -4.132121E+02 |
| 32 | -3.102114E+01 | -3.634273E+00 | -1.362159E+00 | -8.364005E+01 |
| 41 | -2.870908E+01 | 1.997701E+00 | -1.393119E+01 | 1.281945E+01 |
| 42 | -3.988547E+00 | -5.235442E+00 | 3.190647E+01 | -4.690913E+01 |

FIG. 29

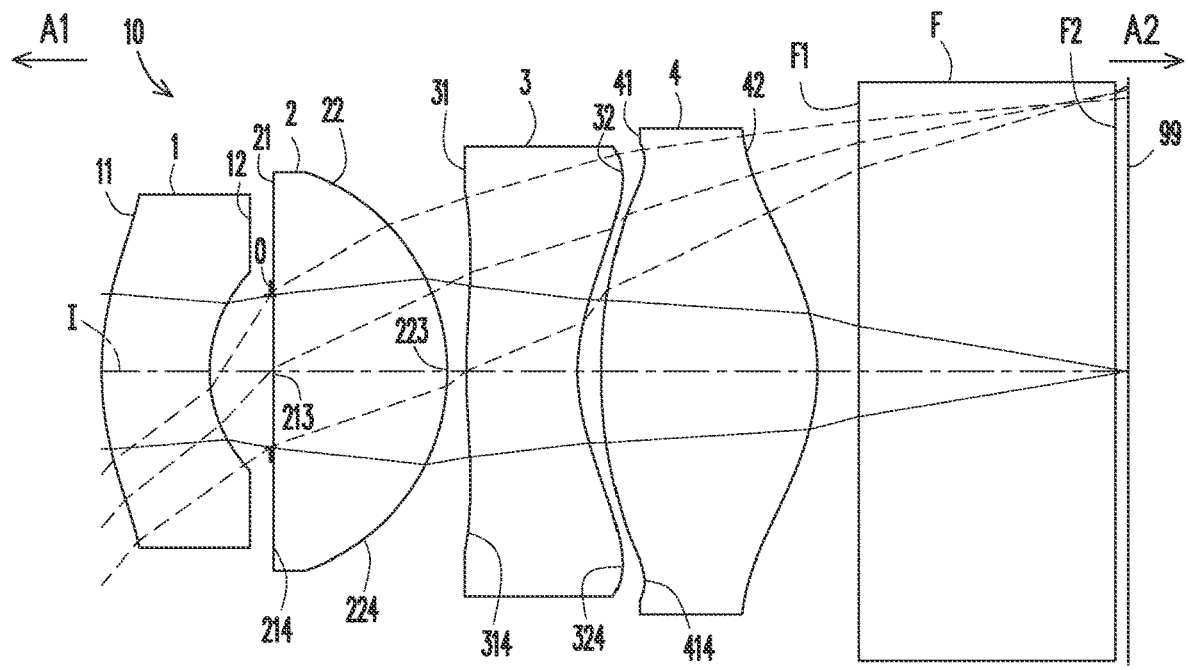
FIG. 30
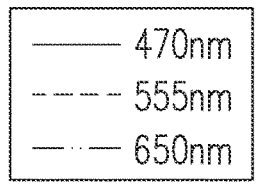
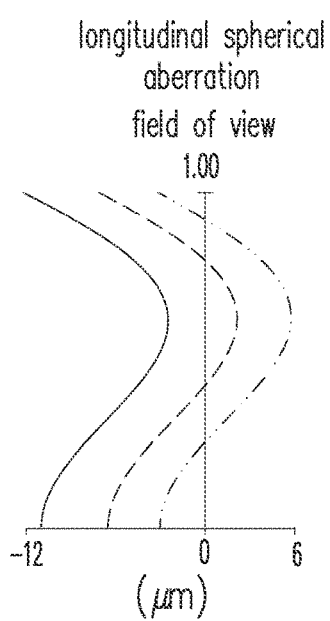
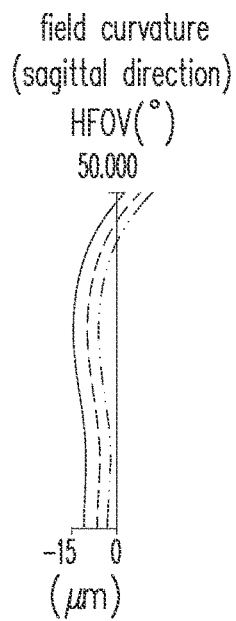
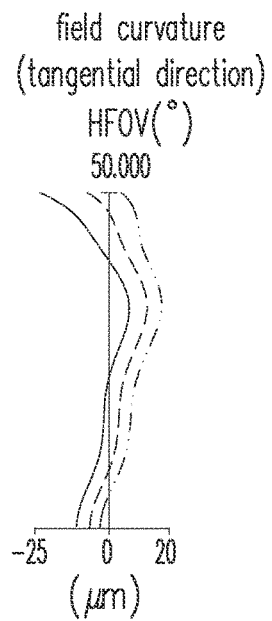
FIG. 31A  FIG. 31B  FIG. 31C  FIG. 31D

| Seventh embodiment ||||||
|---|---|---|---|---|---|---|
| EFL = 0.481 mm, HFOV = 50.000 degrees, TTL = 1.599 mm, Fno = 2.000, ImgH = 0.440 mm |||||||
| Element | Surface | Radius of curvature (mm) | Thickness (mm) | Refractive index | Abbe number | Focal length (mm) |
| Object | | Infinity | Infinity | | | |
| First lens element 1 | Object-side surface 11 | 0.508 | 0.168 | 1.545 | 55.987 | -0.892 |
| | Image-side surface 12 | 0.220 | 0.095 | | | |
| Aperture 0 | | Infinity | 0.005 | | | |
| Second lens element 2 | Object-side surface 21 | Infinity | 0.270 | 1.693 | 52.931 | 0.472 |
| | Image-side surface 22 | -0.328 | 0.030 | | | |
| Third lens element 3 | Object-side surface 31 | 0.978 | 0.173 | 1.567 | 37.533 | -0.833 |
| | Image-side surface 32 | 0.299 | 0.037 | | | |
| Fourth lens element 4 | Object-side surface 41 | 0.844 | 0.337 | 1.544 | 49.922 | 0.474 |
| | Image-side surface 42 | -0.321 | 0.064 | | | |
| Filter F | Object-side surface F1 | Infinity | 0.400 | 1.517 | 64.167 | |
| | Image-side surface F2 | Infinity | 0.020 | | | |
| | Image plane 99 | Infinity | | | | |

FIG. 32

| Surface | K | $a_4$ | $a_6$ | $a_8$ |
|---|---|---|---|---|
| 11 | 1.493529E+00 | -2.067581E+00 | -4.244242E+01 | -2.794751E+02 |
| 12 | -2.399655E-01 | 8.035392E+00 | -3.191514E+02 | 4.317891E+03 |
| 31 | -5.000411E+01 | -9.037250E+00 | 1.087903E+02 | -6.373005E+02 |
| 32 | -4.739975E+00 | -2.420647E+00 | 1.256580E+01 | -2.200989E+02 |
| 41 | 3.355310E-01 | 2.357361E+00 | -2.284185E+01 | -4.498733E+01 |
| 42 | -4.043972E+00 | -4.210679E+00 | 5.767624E+01 | -1.533612E+02 |

FIG. 33

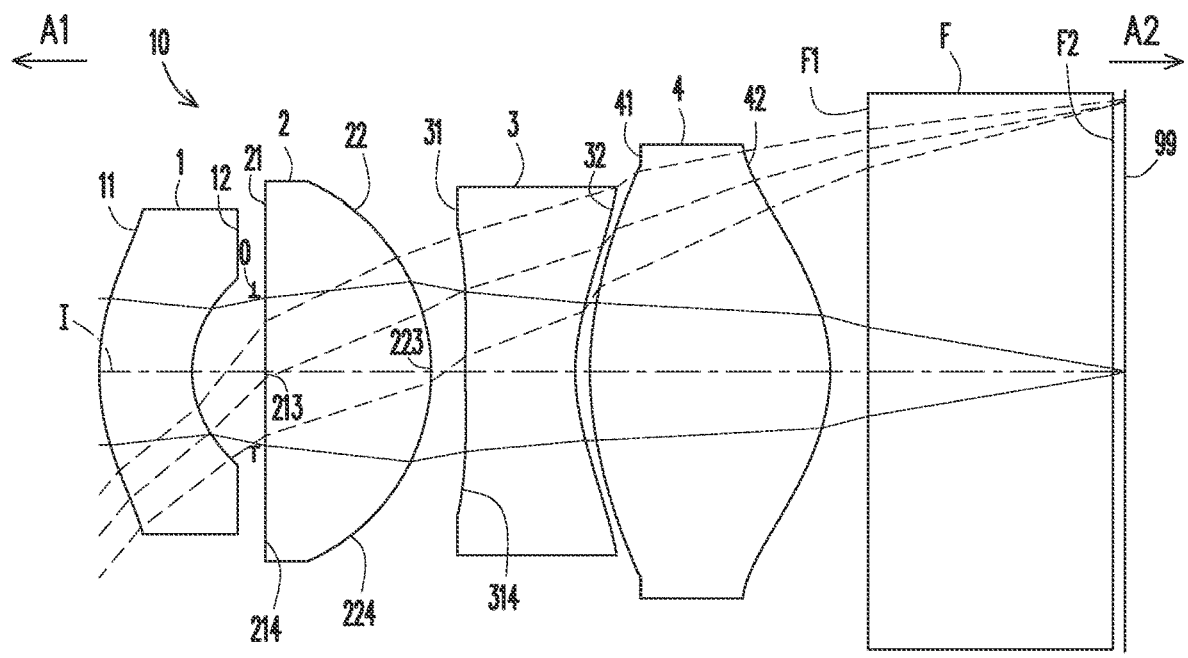
FIG. 34
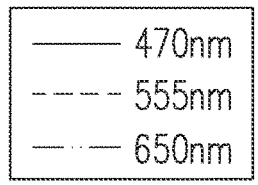
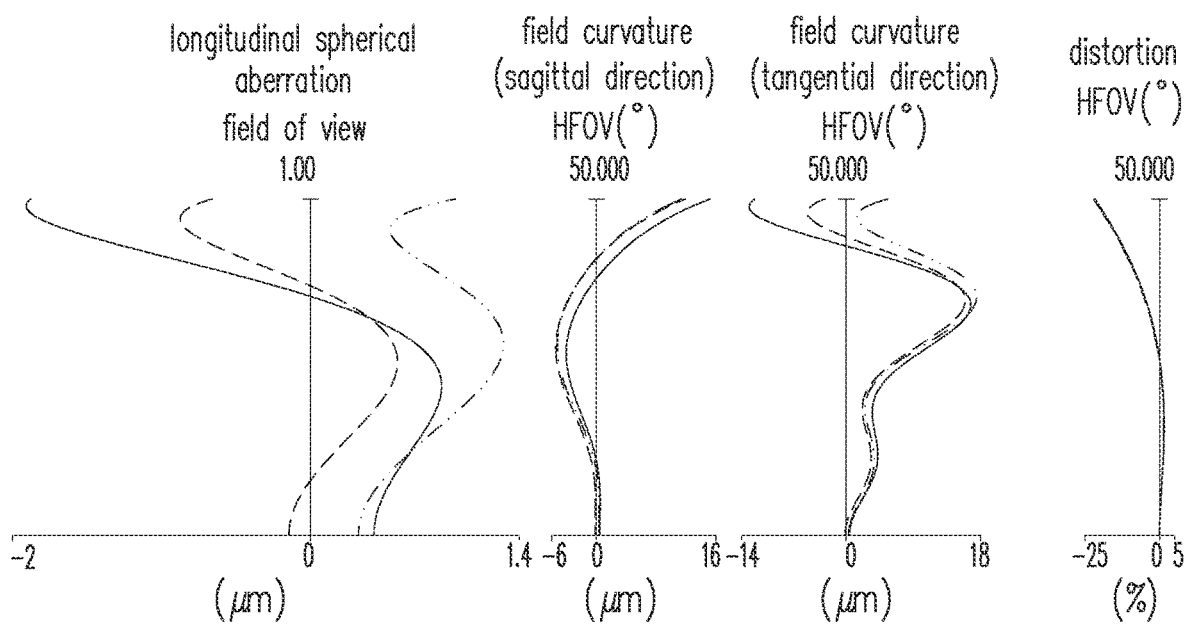
FIG. 35A  FIG. 35B  FIG. 35C  FIG. 35D

| Eighth embodiment | | | | | | |
|---|---|---|---|---|---|---|
| EFL = 0.473 mm, HFOV = 50.000 degrees, TTL = 1.673 mm, Fno = 2.000, ImgH = 0.440 mm | | | | | | |
| Element | Surface | Radius of curvature (mm) | Thickness (mm) | Refractive index | Abbe number | Focal length (mm) |
| Object | | Infinity | Infinity | | | |
| First lens element 1 | Object-side surface 11 | 0.386 | 0.152 | 1.545 | 55.987 | -0.799 |
| | Image-side surface 12 | 0.176 | 0.101 | | | |
| Aperture 0 | | Infinity | 0.019 | | | |
| Second lens element 2 | Object-side surface 21 | Infinity | 0.270 | 1.786 | 44.207 | 0.429 |
| | Image-side surface 22 | -0.339 | 0.056 | | | |
| Third lens element 3 | Object-side surface 31 | 3.333 | 0.179 | 1.661 | 20.373 | -0.544 |
| | Image-side surface 32 | 0.320 | 0.024 | | | |
| Fourth lens element 4 | Object-side surface 41 | 0.535 | 0.391 | 1.545 | 55.987 | 0.421 |
| | Image-side surface 42 | -0.300 | 0.062 | | | |
| Filter F | Object-side surface F1 | Infinity | 0.400 | 1.517 | 64.167 | |
| | Image-side surface F2 | Infinity | 0.019 | | | |
| | Image plane 99 | Infinity | | | | |

FIG. 36

| Surface | K | $a_4$ | $a_6$ | $a_8$ |
|---|---|---|---|---|
| 11 | -2.484536E-01 | -2.271713E+00 | -4.606694E+01 | -9.435985E+01 |
| 12 | -3.592642E-01 | -2.539331E-01 | -1.118755E+02 | -1.016647E+03 |
| 31 | -5.000154E+01 | -1.199124E+01 | 1.506968E+02 | -1.047756E+03 |
| 32 | -6.836204E+00 | -1.896120E+00 | 1.332866E+01 | -1.178366E+02 |
| 41 | -1.569699E+01 | 3.177520E+00 | -1.503348E+01 | 2.791795E+01 |
| 42 | -3.052800E+00 | -4.045257E+00 | 3.678370E+01 | -2.996154E+01 |

FIG. 37

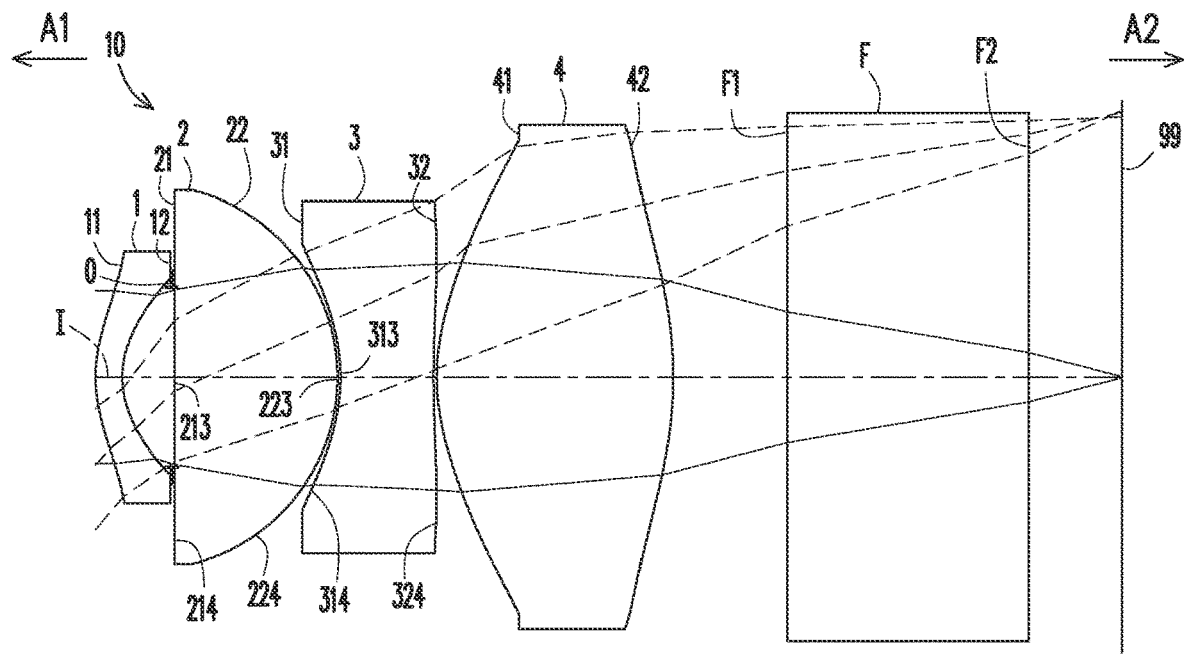
FIG. 38
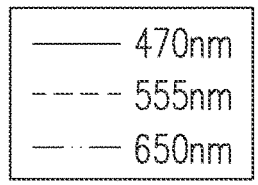
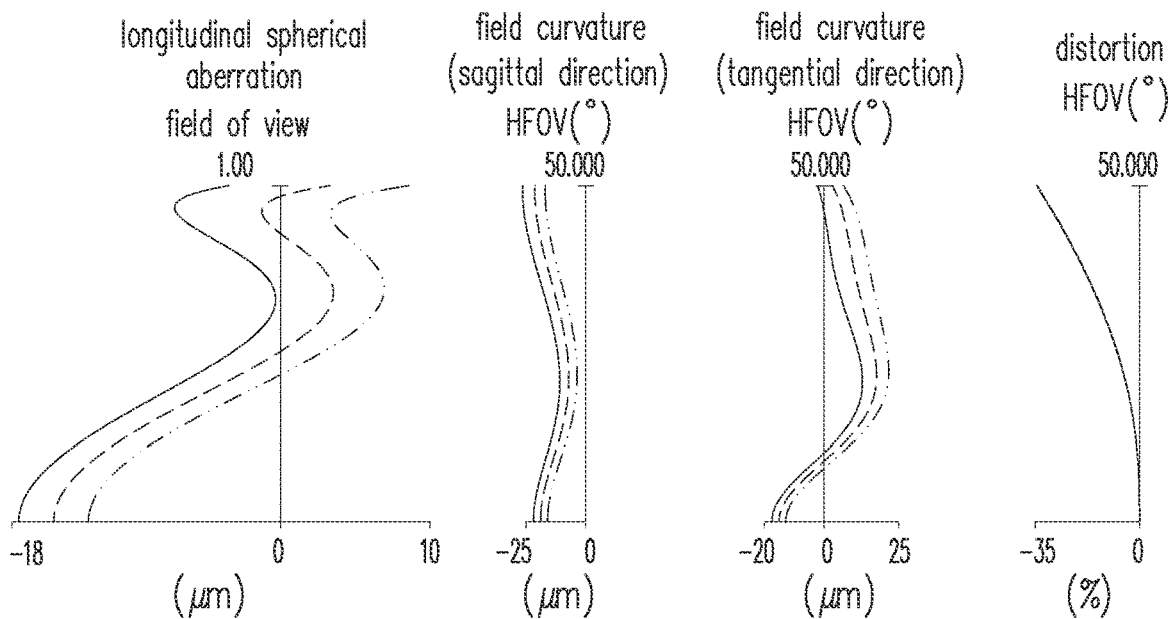
FIG. 39A  FIG. 39B  FIG. 39C  FIG. 39D

| Ninth embodiment ||||||||
|---|---|---|---|---|---|---|
| EFL = 0.557 mm, HFOV = 50.000 degrees, TTL = 1.702 mm, Fno = 2.000, ImgH = 0.439 mm ||||||||
| Element | Surface | Radius of curvature (mm) | Thickness (mm) | Refractive index | Abbe number | Focal length (mm) |
| Object | | Infinity | Infinity | | | |
| First lens element 1 | Object-side surface 11 | 0.246 | 0.044 | 1.545 | 55.987 | -0.866 |
| | Image-side surface 12 | 0.151 | 0.082 | | | |
| Aperture 0 | | Infinity | 0.005 | | | |
| Second lens element 2 | Object-side surface 21 | Infinity | 0.270 | 1.693 | 52.931 | 0.460 |
| | Image-side surface 22 | -0.320 | 0.005 | | | |
| Third lens element 3 | Object-side surface 31 | -0.316 | 0.155 | 1.567 | 37.533 | -0.462 |
| | Image-side surface 32 | 1.861 | 0.005 | | | |
| Fourth lens element 4 | Object-side surface 41 | 0.355 | 0.392 | 1.545 | 55.987 | 0.486 |
| | Image-side surface 42 | -0.644 | 0.190 | | | |
| Filter F | Object-side surface F1 | Infinity | 0.400 | 1.517 | 64.167 | |
| | Image-side surface F2 | Infinity | 0.154 | | | |
| | Image plane 99 | Infinity | | | | |

FIG. 40

| Surface | K | $a_4$ | $a_6$ | $a_8$ |
|---|---|---|---|---|
| 11 | -3.069579E+00 | -1.077842E+01 | -7.030513E+01 | 1.355534E+03 |
| 12 | -1.057363E+00 | -1.775759E+01 | 1.476314E+02 | 5.918020E+03 |
| 31 | -5.433323E+00 | -8.208750E+00 | 1.009623E+02 | 8.159904E+01 |
| 32 | -5.003090E+01 | -2.920114E+00 | -5.394387E+00 | 1.545815E+02 |
| 41 | -5.753470E+00 | 7.370190E-01 | 4.296649E+00 | -3.055437E+01 |
| 42 | -1.283013E+01 | -2.322854E+00 | 3.046644E+01 | -9.883373E+01 |

FIG. 41

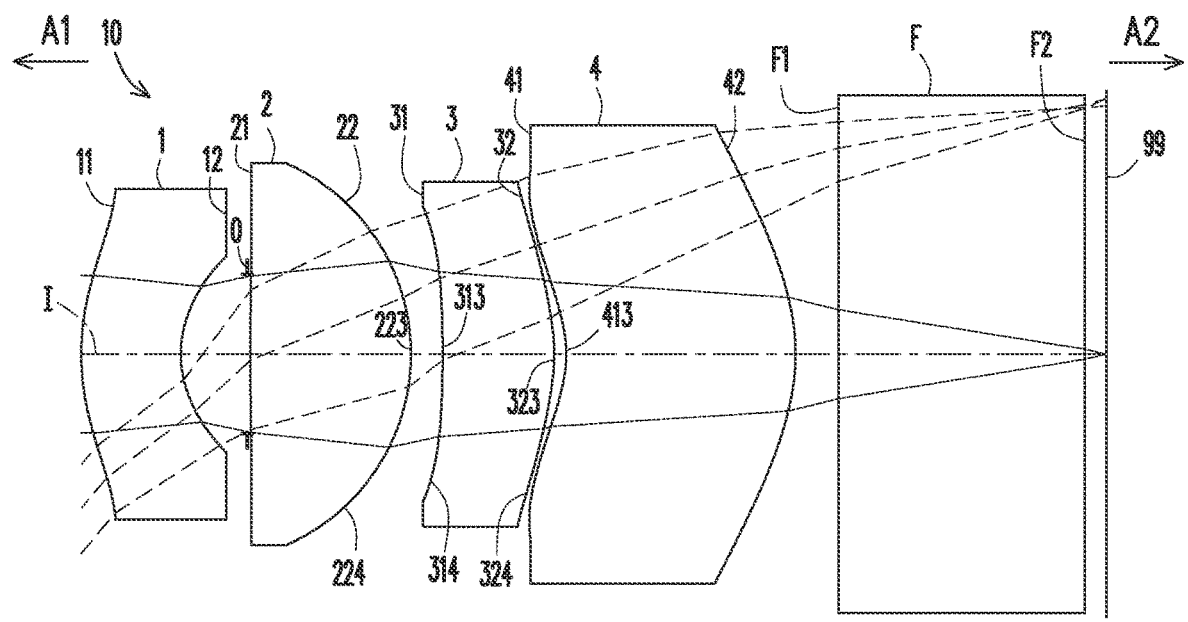
FIG. 42
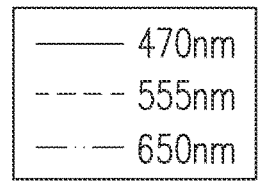
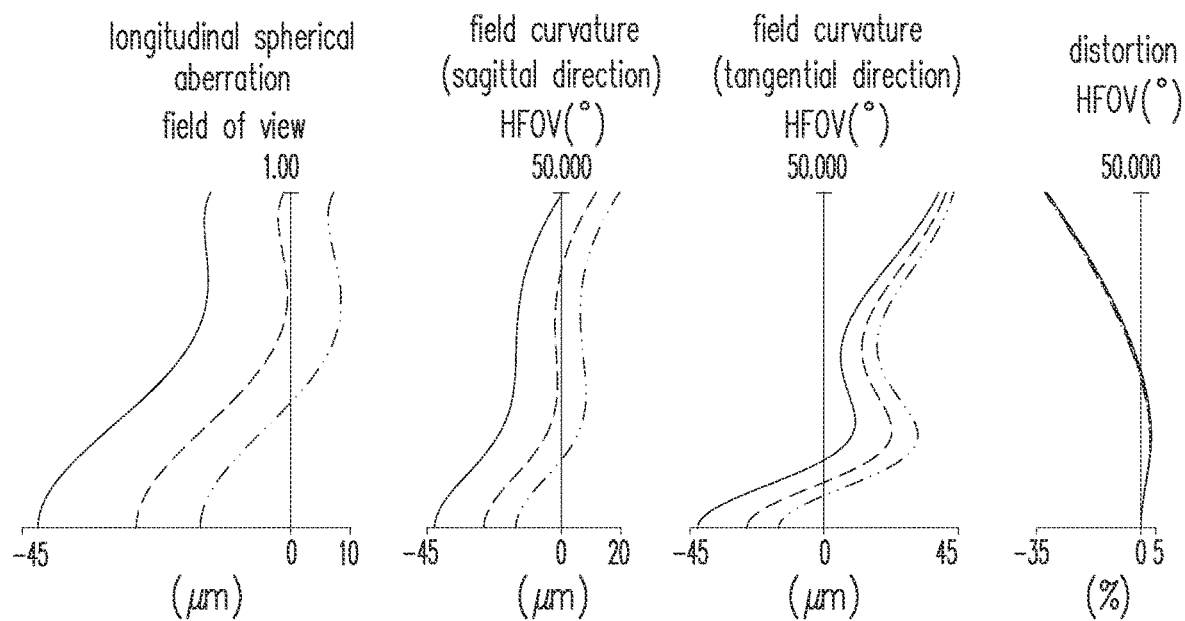
FIG. 43A  FIG. 43B  FIG. 43C  FIG. 43D

| Tenth embodiment ||||||| 
| EFL = 0.509 mm, HFOV = 50.000 degrees, TTL = 1.663 mm, Fno = 2.000, ImgH = 0.414 mm |||||||
| Element | Surface | Radius of curvature (mm) | Thickness (mm) | Refractive index | Abbe number | Focal length (mm) |
|---|---|---|---|---|---|---|
| Object | | Infinity | Infinity | | | |
| First lens element 1 | Object-side surface 11 | 0.397 | 0.162 | 1.567 | 37.533 | -0.786 |
| | Image-side surface 12 | 0.179 | 0.107 | | | |
| Aperture 0 | | Infinity | 0.005 | | | |
| Second lens element 2 | Object-side surface 21 | 6.091 | 0.261 | 1.786 | 44.207 | 0.414 |
| | Image-side surface 22 | -0.339 | 0.051 | | | |
| Third lens element 3 | Object-side surface 31 | -2.620 | 0.181 | 1.671 | 19.243 | 0.532 |
| | Image-side surface 32 | -0.326 | 0.020 | | | |
| Fourth lens element 4 | Object-side surface 41 | -0.202 | 0.372 | 1.545 | 55.987 | -36995.114 |
| | Image-side surface 42 | -0.333 | 0.070 | | | |
| Filter F | Object-side surface F1 | Infinity | 0.400 | 1.517 | 64.167 | |
| | Image-side surface F2 | Infinity | 0.034 | | | |
| | Image plane 99 | Infinity | | | | |

FIG. 44

| Surface | K | $a_4$ | $a_6$ | $a_8$ |
|---|---|---|---|---|
| 11 | -1.380000E+00 | -2.154694E+00 | -8.065449E+01 | 3.719696E+02 |
| 12 | -7.399167E-01 | -6.390532E+00 | 4.694809E+00 | 8.975650E+03 |
| 31 | 2.589305E+01 | -9.083259E+00 | 1.086905E+02 | -1.016562E+03 |
| 32 | -1.624862E+01 | -2.955205E+00 | 1.755392E+01 | 1.038950E+02 |
| 41 | -5.935709E+00 | 4.999980E+00 | -3.613751E+00 | 6.725880E+01 |
| 42 | -6.535067E+00 | -3.858387E+00 | 3.137179E+01 | -8.588241E+01 |

FIG. 45

| Conditional expression | First embodiment | Second embodiment | Third embodiment | Fourth embodiment | Fifth embodiment |
|---|---|---|---|---|---|
| T1 | 0.149 | 0.176 | 0.150 | 0.234 | 0.299 |
| G12 | 0.125 | 0.151 | 0.130 | 0.179 | 0.151 |
| T2 | 0.270 | 0.270 | 0.402 | 0.270 | 0.270 |
| G23 | 0.063 | 0.030 | 0.024 | 0.023 | 0.042 |
| T3 | 0.149 | 0.150 | 0.148 | 0.149 | 0.247 |
| G34 | 0.020 | 0.058 | 0.014 | 0.096 | 0.058 |
| T4 | 0.298 | 0.368 | 0.461 | 0.715 | 0.599 |
| G4F | 0.080 | 0.080 | 0.080 | 0.080 | 0.080 |
| TF | 0.400 | 0.400 | 0.400 | 0.400 | 0.400 |
| GFP | 0.019 | 0.198 | 0.028 | 0.832 | 0.129 |
| BFL | 0.500 | 0.679 | 0.509 | 1.312 | 0.610 |
| EFL | 0.622 | 0.657 | 0.295 | 0.615 | 0.511 |
| TTL | 1.574 | 1.882 | 1.837 | 2.978 | 2.276 |
| TL | 1.074 | 1.203 | 1.328 | 1.666 | 1.666 |
| ALT | 0.866 | 0.964 | 1.160 | 1.368 | 1.415 |
| AAG | 0.208 | 0.239 | 0.168 | 0.298 | 0.251 |
| HFOV | 50.000 | 50.000 | 50.000 | 45.000 | 50.000 |
| TG | 0.270 | 0.368 | 0.402 | 0.270 | 0.270 |
| RLGmin | 0.544 | -0.539 | -0.258 | -0.382 | -0.339 |
| Fno | 2.000 | 2.000 | 2.000 | 1.800 | 2.000 |
| ImgH | 0.500 | 0.452 | 0.494 | 0.504 | 0.500 |

FIG. 46

| Conditional expression | Sixth embodiment | Seventh embodiment | Eighth embodiment | Ninth embodiment | Tenth embodiment |
|---|---|---|---|---|---|
| T1 | 0.187 | 0.168 | 0.152 | 0.044 | 0.162 |
| G12 | 0.091 | 0.100 | 0.120 | 0.087 | 0.113 |
| T2 | 0.143 | 0.270 | 0.270 | 0.270 | 0.261 |
| G23 | 0.034 | 0.030 | 0.056 | 0.005 | 0.051 |
| T3 | 0.144 | 0.173 | 0.179 | 0.155 | 0.181 |
| G34 | 0.025 | 0.037 | 0.024 | 0.005 | 0.020 |
| T4 | 0.374 | 0.337 | 0.391 | 0.392 | 0.372 |
| G4F | 0.170 | 0.064 | 0.062 | 0.190 | 0.070 |
| TF | 0.400 | 0.400 | 0.400 | 0.400 | 0.400 |
| GFP | 0.135 | 0.020 | 0.019 | 0.154 | 0.034 |
| BFL | 0.705 | 0.484 | 0.481 | 0.744 | 0.504 |
| EFL | 0.601 | 0.481 | 0.473 | 0.557 | 0.509 |
| TTL | 1.702 | 1.599 | 1.673 | 1.702 | 1.663 |
| TL | 0.997 | 1.115 | 1.192 | 0.958 | 1.159 |
| ALT | 0.848 | 0.949 | 0.992 | 0.861 | 0.975 |
| AAG | 0.149 | 0.167 | 0.200 | 0.097 | 0.184 |
| HFOV | 50.000 | 50.000 | 50.000 | 50.000 | 50.000 |
| TG | 0.143 | 0.270 | 0.270 | 0.270 | 0.261 |
| RLGmin | -0.483 | -0.328 | -0.339 | -0.320 | -0.339 |
| Fno | 2.000 | 2.000 | 2.000 | 2.000 | 2.000 |
| ImgH | 0.445 | 0.440 | 0.440 | 0.439 | 0.414 |

FIG. 47

| Conditional expression | First embodiment | Second embodiment | Third embodiment | Fourth embodiment | Fifth embodiment |
|---|---|---|---|---|---|
| \|RLGmin\|/TG | 2.017 | 1.462 | 0.642 | 1.416 | 1.255 |
| HFOV/TTL | 31.765 | 26.572 | 27.219 | 15.110 | 21.972 |
| ALT/(T2+G23) | 2.603 | 3.219 | 2.724 | 4.674 | 4.532 |
| BFL/(T3+G34) | 2.953 | 3.272 | 3.152 | 5.343 | 2.001 |
| TL/(EFL+AAG) | 1.294 | 1.343 | 2.870 | 1.825 | 2.187 |
| (G12+T4)/T3 | 2.844 | 3.472 | 4.001 | 5.981 | 3.037 |
| HFOV/(TL*Fno) | 23.273 | 20.781 | 18.822 | 15.006 | 15.009 |
| (EFL+T4)/(G12+G23) | 4.904 | 5.667 | 4.908 | 6.597 | 5.759 |
| T4/T1 | 2.002 | 2.091 | 3.077 | 3.058 | 2.001 |
| (T2+T3+T4)/EFL | 1.153 | 1.200 | 3.426 | 1.845 | 2.183 |
| BFL/AAG | 2.402 | 2.844 | 3.033 | 4.407 | 2.432 |
| T4/G12 | 2.388 | 2.434 | 3.542 | 3.998 | 3.979 |
| (V1+V2+V3)/V4 | 2.309 | 2.500 | 2.309 | 2.309 | 2.309 |
| TTL/(G12+T2+T4) | 2.271 | 2.382 | 1.850 | 2.559 | 2.232 |
| ImgH/(G12+G23) | 2.664 | 2.498 | 3.208 | 2.500 | 2.595 |
| (T3+BFL)/T4 | 2.175 | 2.248 | 1.424 | 2.044 | 1.431 |
| (T2+T4)/T3 | 3.819 | 4.264 | 5.843 | 6.591 | 3.521 |
| G12/(G23+G34) | 1.502 | 1.735 | 3.460 | 1.504 | 1.501 |
| T2/G12 | 2.161 | 1.783 | 3.090 | 1.510 | 1.794 |

FIG. 48

| Conditional expression | Sixth embodiment | Seventh embodiment | Eighth embodiment | Ninth embodiment | Tenth embodiment |
|---|---|---|---|---|---|
| \|RLGmin\|/TG | 3.388 | 1.216 | 1.255 | 1.186 | 1.299 |
| HFOV/TTL | 29.381 | 31.261 | 29.883 | 29.386 | 30.060 |
| ALT/(T2+G23) | 4.804 | 3.162 | 3.041 | 3.130 | 3.125 |
| BFL/(T3+G34) | 4.178 | 2.304 | 2.372 | 4.658 | 2.513 |
| TL/(EFL+AAG) | 1.329 | 1.722 | 1.771 | 1.464 | 1.673 |
| (G12+T4)/T3 | 3.229 | 2.520 | 2.855 | 3.094 | 2.682 |
| HFOV/(TL*Fno) | 25.070 | 22.414 | 20.977 | 26.108 | 21.564 |
| (EFL+T4)/(G12+G23) | 7.810 | 6.287 | 4.905 | 10.311 | 5.364 |
| T4/T1 | 2.000 | 2.000 | 2.576 | 8.849 | 2.303 |
| (T2+T3+T4)/EFL | 1.099 | 1.622 | 1.776 | 1.466 | 1.599 |
| BFL/AAG | 4.715 | 2.902 | 2.406 | 7.671 | 2.739 |
| T4/G12 | 4.109 | 3.366 | 3.256 | 4.496 | 3.300 |
| (V1+V2+V3)/V4 | 2.616 | 2.934 | 2.153 | 2.616 | 1.804 |
| TTL/(G12+T2+T4) | 2.800 | 2.263 | 2.142 | 2.273 | 2.231 |
| ImgH/(G12+G23) | 3.564 | 3.383 | 2.498 | 4.772 | 2.520 |
| (T3+BFL)/T4 | 2.269 | 1.952 | 1.689 | 2.295 | 1.840 |
| (T2+T4)/T3 | 3.587 | 3.500 | 3.693 | 4.276 | 3.500 |
| G12/(G23+G34) | 1.559 | 1.500 | 1.500 | 8.803 | 1.585 |
| T2/G12 | 1.567 | 2.698 | 2.249 | 3.100 | 2.311 |

FIG. 49

OPTICAL IMAGING LENS

CROSS-REFERENCE TO RELATED APPLICATION

This application claims the priority benefit of China application no. 202210180570.8, filed on Feb. 25, 2022. The entirety of the above-mentioned patent application is hereby incorporated by reference herein and made a part of this specification.

BACKGROUND

Technical Field

The disclosure relates to an optical component, and in particular to an optical imaging lens.

Description of Related Art

In recent years, optical imaging lenses have continued to evolve. In addition to requiring the lens to be light, thin, short, and small, improving the imaging quality of the lens such as the aberration and chromatic aberration is more and more important. However, the design of the optical imaging lens is not simply to scale down the lens with good imaging quality to produce an optical imaging lens with both imaging quality and miniaturization. The design process not only involves the surface shape of the lens element, the thickness of the lens element, or the air gap between lens elements, but also must consider the actual production issues such as production and assembly yield. Especially for small size lens, slight size variation will affect the imaging quality of the entire optical system. In addition, the difference in temperature may shift the focusing position of the optical imaging lens and affect the imaging quality. In order to cope with more diversified applications, optical imaging lens need to maintain good thermal stability under different temperature environments. If the material of the lens element is glass, it is helpful to improve thermal stability. However, in order to meet the miniaturization lens, the size of the glass lens element cannot be too large. The general glass grinding technology often makes the dimensional tolerance of the glass lens element too large when manufacturing the glass lens element with small size, and has the problem of low manufacturing yield. Therefore, how to design a miniature lens simultaneously with good thermal stability, with good imaging quality, and with a large field of view has become a challenge and an issue to be solved.

SUMMARY

The disclosure provides an optical imaging lens, which can provide a smaller size while the manufacturing tolerance is allowable. The disclosure also simultaneously improves the manufacturing yield, has with good thermal stability, has good imaging quality, and has a large field of view.

An embodiment of the disclosure provides an optical imaging lens, sequentially including a first, second, third, and fourth lens elements along an optical axis from an object side to an image side, is provided. Each of the first to fourth lens elements includes an object-side surface facing the object side and allowing imaging rays to pass through, and an image-side surface facing the image side and allowing the imaging rays to pass through. An optical axis region of the object-side surface of the first lens element is convex. The second lens element is a glass lens element. The third lens element has negative refracting power. An optical axis region of the image-side surface of the fourth lens element is convex. Lens elements of the optical imaging lens are only the four lens elements, and the optical imaging lens further satisfies following conditional expressions: $HFOV/TTL \geq 15.000$ degrees/mm and $0.500 \leq |RLGmin|/TG$, where HFOV is a half field of view of the optical imaging lens, TTL is a distance from the object-side surface of the first lens element to an image plane on the optical axis, RLGmin is a radius of curvature of a smaller one of absolute values of radius of curvatures of the object side surface and the image side surface of the glass lens element of the optical imaging lens, and TG is a thickness of the glass lens element on the optical axis.

An embodiment of the disclosure provides an optical imaging lens, sequentially including a first, second, third, and fourth lens elements along an optical axis from an object side to an image side, is provided. Each of the first to fourth lens elements includes an object-side surface facing the object side and allowing imaging rays to pass through, and an image-side surface facing the image side and allowing the imaging rays to pass through. An optical axis region of the object-side surface of the first lens element is convex. The second lens element is a glass lens element. A periphery region of the object-side surface of the third lens element is concave. Lens elements of the optical imaging lens are only the four lens elements, and the optical imaging lens further satisfies following conditional expressions: $HFOV/TTL \geq 15.000$ degrees/mm and $0.500 \leq |RLGmin|/TG$, where HFOV is a half field of view of the optical imaging lens, TTL is a distance from the object-side surface of the first lens element to an image plane on the optical axis, RLGmin is a radius of curvature of a smaller one of absolute values of radius of curvatures of the object side surface and the image side surface of the glass lens element of the optical imaging lens, and TG is a thickness of the glass lens element on the optical axis.

An embodiment of the disclosure provides an optical imaging lens, sequentially including a first, second, third, and fourth lens elements along an optical axis from an object side to an image side, is provided. Each of the first to fourth lens elements includes an object-side surface facing the object side and allowing imaging rays to pass through, and an image-side surface facing the image side and allowing the imaging rays to pass through. An optical axis region of the object-side surface of the first lens element is convex, and a periphery region of the image-side surface of the first lens element is concave. The second lens element is a glass lens element. Lens elements of the optical imaging lens are only the four lens elements, and the optical imaging lens further satisfies following conditional expressions: $HFOV/TTL \geq 15.000$ degrees/mm and $0.500 \leq |RLGmin|/TG$, where HFOV is a half field of view of the optical imaging lens, TTL is a distance from the object-side surface of the first lens element to an image plane on the optical axis, RLGmin is a radius of curvature of a smaller one of absolute values of radius of curvatures of the object side surface and the image side surface of the glass lens element of the optical imaging lens, and TG is a thickness of the glass lens element on the optical axis.

Based on the above, the beneficial effects of the optical imaging lens of the embodiments of the disclosure are: by satisfying the concave-convex curved surface arrangement design of the lens elements, the conditions of the refracting power, and the design of the conditional expressions, the optical imaging lens can have a smaller size while the manufacturing tolerance is allowable. The optical imaging lens also simultaneously improves the manufacturing yield, has with good thermal stability, has good imaging quality, and has a large field of view.

BRIEF DESCRIPTION OF THE DRAWINGS

FIG. 6 is a schematic diagram of an optical imaging lens of a first embodiment of the disclosure.

FIG. 7A to FIG. 7D are diagrams of longitudinal spherical aberration and various aberrations of an optical imaging lens of a first embodiment.

FIG. 8 illustrates detailed optical data of an optical imaging lens of a first embodiment of the disclosure.

FIG. 9 illustrates aspheric parameters of an optical imaging lens of a first embodiment of the disclosure.

FIG. 12 illustrates detailed optical data of an optical imaging lens of a second embodiment of the disclosure.

FIG. 13 illustrates aspheric parameters of an optical imaging lens of a second embodiment of the disclosure.

FIG. 16 illustrates detailed optical data of an optical imaging lens of a third embodiment of the disclosure.

FIG. 17 illustrates aspheric parameters of an optical imaging lens of a third embodiment of the disclosure.

FIG. 18 is a schematic diagram of an optical imaging lens of a fourth embodiment of the disclosure.

FIG. 19A to FIG. 19D are diagrams of longitudinal spherical aberration and various aberrations of an optical imaging lens of a fourth embodiment.

FIG. 20 illustrates detailed optical data of an optical imaging lens of a fourth embodiment of the disclosure.

FIG. 21 illustrates aspheric parameters of an optical imaging lens of a fourth embodiment of the disclosure.

FIG. 22 is a schematic diagram of an optical imaging lens of a fifth embodiment of the disclosure.

FIG. 23A to FIG. 23D are diagrams of longitudinal spherical aberration and various aberrations of an optical imaging lens of a fifth embodiment.

FIG. 24 illustrates detailed optical data of an optical imaging lens of a fifth embodiment of the disclosure.

FIG. 25 illustrates aspheric parameters of an optical imaging lens of a fifth embodiment of the disclosure.

FIG. 26 is a schematic diagram of an optical imaging lens of a sixth embodiment of the disclosure.

FIG. 27A to FIG. 27D are diagrams of longitudinal spherical aberration and various aberrations of an optical imaging lens of a sixth embodiment.

FIG. 28 illustrates detailed optical data of an optical imaging lens of a sixth embodiment of the disclosure.

FIG. 29 illustrates aspheric parameters of an optical imaging lens of a sixth embodiment of the disclosure.

FIG. 30 is a schematic diagram of an optical imaging lens of a seventh embodiment of the disclosure.

FIG. 31A to FIG. 31D are diagrams of longitudinal spherical aberration and various aberrations of an optical imaging lens of a seventh embodiment.

FIG. 32 illustrates detailed optical data of an optical imaging lens of a seventh embodiment of the disclosure.

FIG. 33 illustrates aspheric parameters of an optical imaging lens of a seventh embodiment of the disclosure.

FIG. 34 is a schematic diagram of an optical imaging lens of an eighth embodiment of the disclosure.

FIG. 35A to FIG. 35D are diagrams of longitudinal spherical aberration and various aberrations of an optical imaging lens of an eighth embodiment.

FIG. 36 illustrates detailed optical data of an optical imaging lens of an eighth embodiment of the disclosure.

FIG. 37 illustrates aspheric parameters of an optical imaging lens of an eighth embodiment of the disclosure.

FIG. 38 is a schematic diagram of an optical imaging lens of a ninth embodiment of the disclosure.

FIG. 39A to FIG. 39D are diagrams of longitudinal spherical aberration and various aberrations of an optical imaging lens of a ninth embodiment.

FIG. 40 illustrates detailed optical data of an optical imaging lens of a ninth embodiment of the disclosure.

FIG. 41 illustrates aspheric parameters of an optical imaging lens of a ninth embodiment of the disclosure.

FIG. 42 is a schematic diagram of an optical imaging lens of a tenth embodiment of the disclosure.

FIG. 43A to FIG. 43D are diagrams of longitudinal spherical aberration and various aberrations of an optical imaging lens of a tenth embodiment.

FIG. 44 illustrates detailed optical data of an optical imaging lens of a tenth embodiment of the disclosure.

FIG. 45 illustrates aspheric parameters of an optical imaging lens of a tenth embodiment of the disclosure.

FIG. 46 to FIG. 49 illustrate all important parameters and numerical values of relational expressions of the optical imaging lenses of the first to tenth embodiments of the disclosure.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
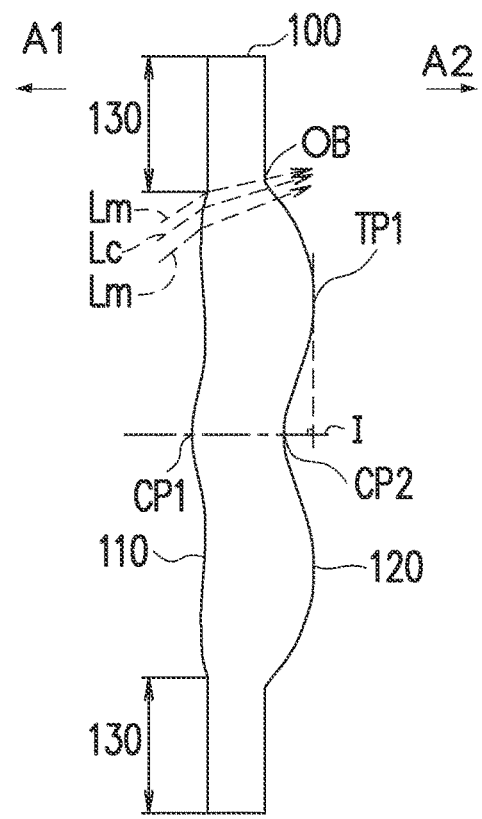
FIG. 1 is a schematic diagram illustrating a surface shape structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
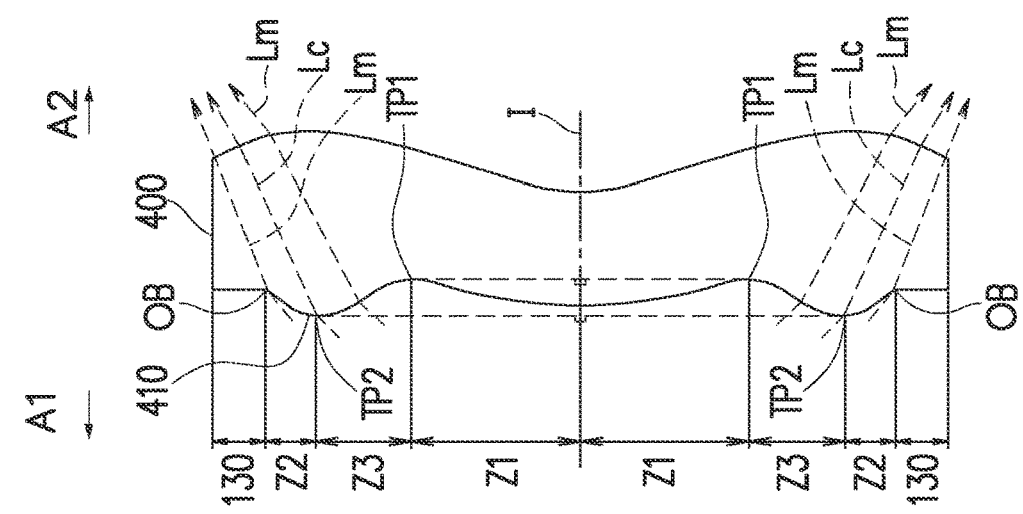
FIG. 4 is a schematic diagram illustrating a surface shape structure of a lens element of Example II.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
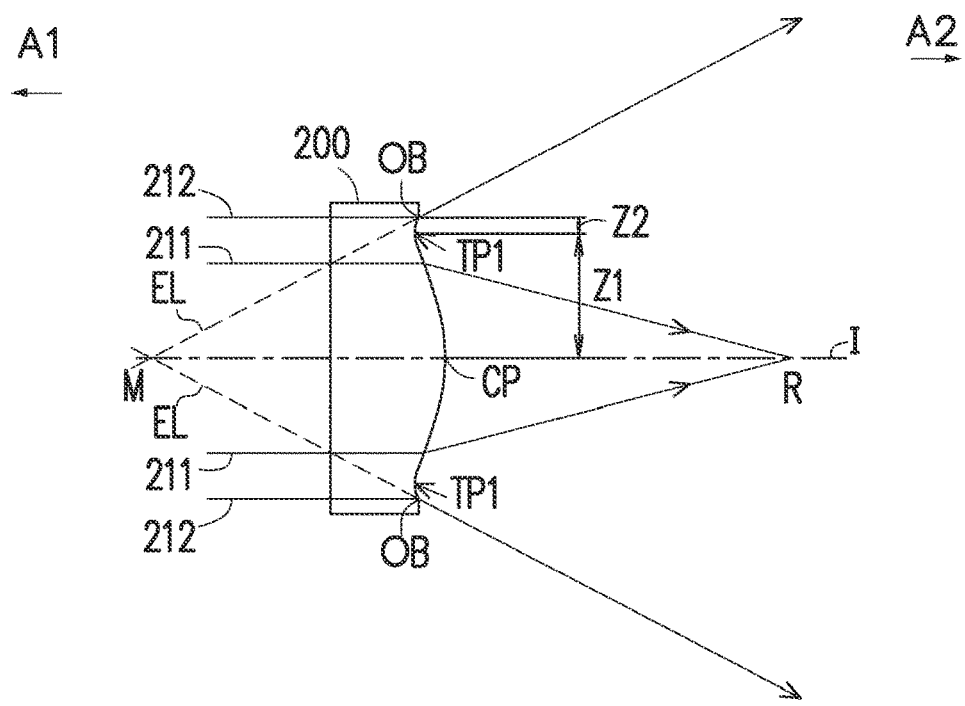
FIG. 2 is a schematic diagram illustrating a concave-convex structure and a focal point of rays of a lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
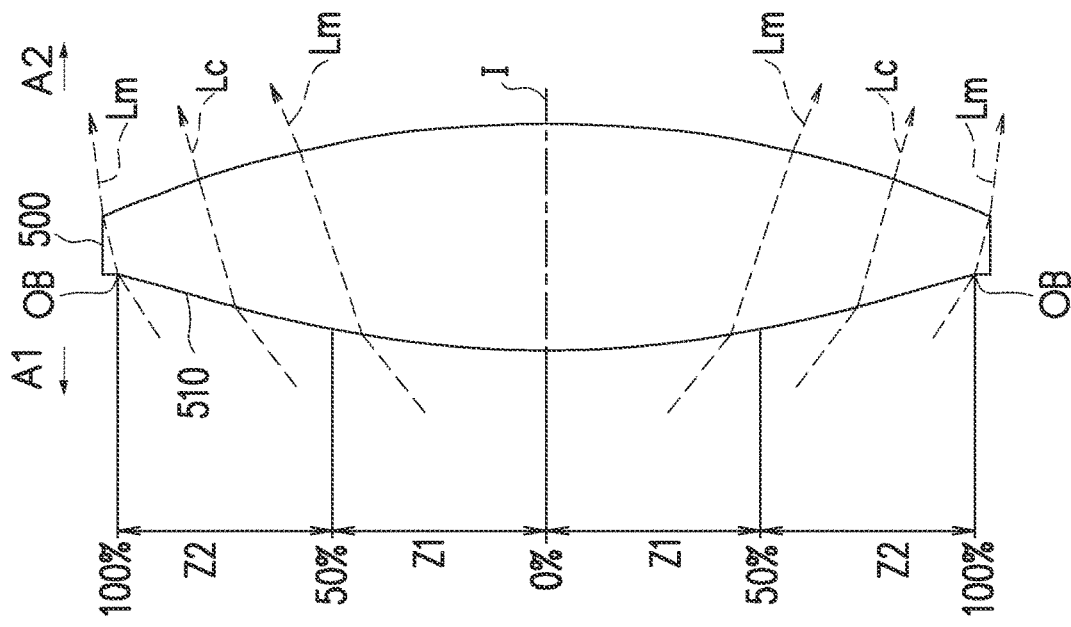
FIG. 5 is a schematic diagram illustrating a surface shape structure of a lens element of Example III.
Figure 3:
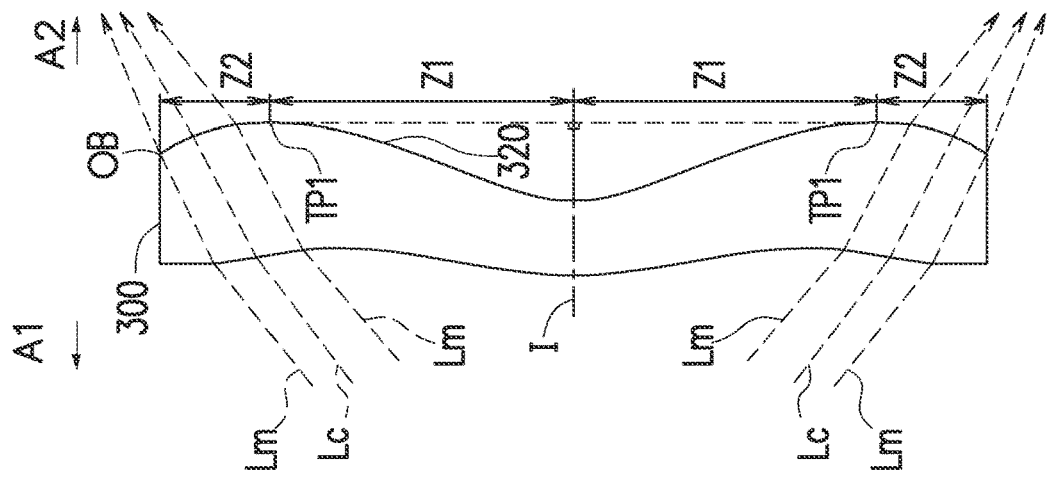
FIG. 3 is a schematic diagram illustrating a surface shape structure of a lens element of Example I.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic diagram of an optical imaging lens of a first embodiment of the disclosure. FIG. 7A to FIG. 7D are diagrams of longitudinal spherical aberration and various aberrations of an optical imaging lens of a first embodiment. Please refer to FIG. 6 first. An optical imaging lens 10 of the first embodiment of the disclosure sequentially includes a first lens element 1, a second lens element 2, a third lens element 3, a fourth lens element 4 and a filter F along an optical axis I of the optical imaging lens 10 from an object side A1 to an image side A2. An aperture 0 is disposed between the first lens element 1 and the second lens element 2. After rays emitted from an object enter the optical imaging lens 10, and pass through the first lens element 1, the aperture 0, the second lens element 2, the third lens element 3, the fourth lens element 4, and the filter F, an image is formed on an image plane 99. The filter F is disposed between an image-side surface 42 of the fourth lens element 4 and the image plane 99. It is supplemented that the object side A1 is a side facing the object and the image side A2 is a side facing the image plane 99. In an embodiment, the filter F may be an infrared (IR) cut filter, but the disclosure is not limited thereto.

In this embodiment, the first lens element 1, the second lens element 2, the third lens element 3, the fourth lens element 4, and the filter F of the optical imaging lens 10 respectively have an object-side surface 11, 21, 31, 41, or F1 facing the object side A1 and allowing imaging rays to pass through, and an image-side surface 12, 22, 32, 42, or F2 facing the image side A2 and allowing the imaging rays to pass through.

The first lens element 1 has negative refracting power. The material of the first lens element 1 may be plastic, but the disclosure is not limited thereto. An optical axis region 113 of the object-side surface 11 of the first lens element 1 is convex, and a periphery region 114 thereof is convex. An optical axis region 123 of the image-side surface 12 of the first lens element 1 is concave, and a periphery region 124 thereof is concave. In this embodiment, the object-side surface 11 and the image-side surface 12 of the first lens element 1 are both aspheric surfaces, but the disclosure is not limited thereto.

The second lens element 2 has positive refracting power. The material of the second lens element 2 may be glass, but the disclosure is not limited thereto. An optical axis region 213 of the object-side surface 21 of the second lens element 2 is convex, and a periphery region 214 thereof is convex. An optical axis region 223 of the image-side surface 22 of the second lens element 2 is plane, and a periphery region 224 thereof is plane. In this embodiment, the object-side surface 21 is a spherical surface, but the disclosure is not limited thereto.

The third lens element 3 has negative refracting power. The material of the third lens element 3 may be plastic, but the disclosure is not limited thereto. An optical axis region 313 of the object-side surface 31 of the third lens element 3 is convex, and a periphery region 314 thereof is convex. An optical axis region 323 of the image-side surface 32 of the third lens element 3 is concave, and a periphery region 324 thereof is concave. In this embodiment, the object-side surface 31 and the image-side surface 32 of the third lens element 3 are both aspheric surfaces, but the disclosure is not limited thereto.

The fourth lens element 4 has positive refracting power. The material of the fourth lens element 4 may be plastic, but the disclosure is not limited thereto. An optical axis region 413 of the object-side surface 41 of the fourth lens element 4 is convex, and a periphery region 414 thereof is convex. An optical axis region 423 of the image-side surface 42 of the fourth lens element 4 is convex, and a periphery region 424 thereof is convex. In this embodiment, the object-side surface 41 and the image-side surface 42 of the fourth lens element 4 are both aspheric surfaces, but the disclosure is not limited thereto.

In this embodiment, lens elements of the optical imaging lens 10 are only the four lens elements.

Other detailed optical data of the first embodiment is shown in FIG. 8, and the effective focal length (EFL) of the optical imaging lens 10 of the first embodiment is 0.622 millimeters (mm), the half field of view (HFOV) is 50.000 degrees, the F-number (Fno) is 2.000, the system length is 1.574 mm, and the image height is 0.500 mm. The system length refers to the distance from the object-side surface 11 of the first lens element 1 to the image plane 99 on the optical axis I.

In addition, in this embodiment, a total of the six object-side surfaces 11, 31, and 41, and image-side surfaces 12, 32, and 42 of the first lens element 1, the third lens element 3, and the fourth lens element 4 are all aspheric surfaces. The object-side surfaces 11, 31, and 41, and the image-side surfaces 12, 32, and 42 are general even aspheric surfaces. The aspheric surfaces are defined by the following equation:

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i} \qquad (1)$$

where
R: the radius of curvature of a lens element surface near the optical axis I;
Z: the depth of an aspheric surface (the perpendicular distance between a point Y from the optical axis I on the aspheric surface and a tangent plane tangent to the vertex on the aspheric optical axis I);
Y: the distance between a point on an aspheric curve and the optical axis I;
K: conic constant; and
$a_{2i}$: the 2i-th order aspheric coefficient.

The aspheric coefficients of the object-side surface 11 of the first lens element 1 to the image-side surface 42 of the fourth lens element 4 in Equation (1) are shown in FIG. 9. A column number 11 in FIG. 9 indicates the aspheric coefficient of the object-side surface 11 of the first lens element 1, and the other columns may be deduced by analogy. In this embodiment and the following embodiments, the 2-nd order aspheric coefficients $a_2$ are all 0.

In addition, the relationship between important parameters in the optical imaging lens 10 of the first embodiment is shown in FIG. 46, where the unit of HFOV is degrees, Fno has no unit, and the unit of the remaining parameters is millimeter.

f1 is the focal length of the first lens element 1;
f2 is the focal length of the second lens element 2;
f3 is the focal length of the third lens element 3;
f4 is the focal length of the fourth lens element 4;
n1 is the refractive index of the first lens element 1;
n2 is the refractive index of the second lens element 2;
n3 is the refractive index of the third lens element 3;
n4 is the refractive index of the fourth lens element 4;
V1 is the Abbe number of the first lens element 1, and the Abbe number may also be referred to as the chromatic dispersion coefficient;
V2 is the Abbe number of the second lens element 2;
V3 is the Abbe number of the third lens element 3;
V4 is the Abbe number of the fourth lens element 4;
T1 is the thickness of the first lens element 1 on the optical axis I;
T2 is the thickness of the second lens element 2 on the optical axis I;
T3 is the thickness of the third lens element 3 on the optical axis I;
T4 is the thickness of the fourth lens element 4 on the optical axis I;
G12 is the air gap between the first lens element 1 and the second lens element 2 on the optical axis I, and is also the distance from the image-side surface 12 of the first lens element 1 to the object-side surface 21 of the second lens element 2 on the optical axis I;
G23 is the air gap between the second lens element 2 and the third lens element 3 on the optical axis I, and is also the distance from the image-side surface 22 of the second lens element 2 to the object-side surface 31 of the third lens element 3 on the optical axis I;
G34 is the air gap between the third lens element 3 and the fourth lens element 4 on the optical axis I, and is also the distance from the image-side surface 32 of the third lens element 3 to the object-side surface 41 of the fourth lens element 4 on the optical axis I;
G4F is the air gap between the fourth lens element 4 and the filter F on the optical axis I, and is also the distance from the image-side surface 42 of the fourth lens element 4 to the object-side surface F1 of the filter F on the optical axis I;
TF is the thickness of the filter F on the optical axis I;
GFP is the air gap between the filter F and the image plane 99 on the optical axis I, and is also the distance from the image-side surface F2 of the filter F to the image plane 99 on the optical axis I;
AAG is the sum of three air gaps from the first lens element 1 to the fourth lens element 4 on the optical axis I, that is, the sum of the air gaps G12, G23, and G34;
ALT is the sum of thicknesses of the four lens elements from the first lens element 1 to the fourth lens element 4 on the optical axis I, that is, the sum of thicknesses T1, T2, T3, and T4;
EFL is the effective focal length of the optical imaging lens 10;
BFL is the distance from the image-side surface 42 of the fourth lens element 4 to the image plane 99 on the optical axis I;
TTL is the distance from the object-side surface 11 of the first lens element 1 to the image plane 99 on the optical axis I;
TL is the distance from the object-side surface 11 of the first lens element 1 to the image-side surface 42 of the fourth lens element 4 on the optical axis I;
HFOV is the half field of view of the optical imaging lens 10;
ImgH is the image height of the optical imaging lens 10; and
Fno is the F-number of the optical imaging lens 10.
In addition, it is further defined that:
RLGmin is a radius of curvature of a smaller one of absolute values of radius of curvatures of the object side surface and the image side surface of the glass lens element of the optical imaging lens 10. For example, the second lens element 2 is a glass lens element, then RLGmin is the radius of curvature of the smaller one of the absolute values of radius of curvatures of the object side surface 21 and the image side surface 22 of the second lens element 2; and
TG is a thickness of the glass lens element on the optical axis I. For example, the second lens element 2 is a glass lens element, then TG is the thickness of the second lens element 2 on the optical axis I.

Please refer to FIG. 7A to FIG. 7D. FIG. 7A illustrates the longitudinal spherical aberration of the first embodiment. FIG. 7B and FIG. 7C respectively illustrate the field curvature aberration in the sagittal direction and the field curvature aberration in the tangential direction on the image plane 99 of the first embodiment when the wavelengths are 470 nm, 555 nm, and 650 nm. FIG. 7D illustrates the distortion aberration on the image plane 99 of the first embodiment when the wavelengths are 470 nm, 555 nm, and 650 nm. The longitudinal spherical aberration of the first embodiment is shown in FIG. 7A. The curves formed by the wavelengths are all very close to and approaching the middle, which indicates that off-axis rays at different heights of each wavelength are all concentrated near an imaging point. It can be seen from the skewness of the curve of each wavelength that the deviation of the imaging point of the off-axis rays at different heights is controlled within the range of ±14 microns (μm). Therefore, the first embodiment does significantly improve the spherical aberration of the same wavelength. In addition, the distances between the three representative wavelengths are also fairly close to each other, which represents that the imaging positions of rays with different wavelengths are fairly concentrated, so that the chromatic aberration is also significantly improved.

In the two field curvature aberration diagrams in FIG. 7B and FIG. 7C, the focal length variation of the three representative wavelengths within the entire field of view fall within 45 μm, which indicates that the optical system of the first embodiment can effectively eliminate aberrations. The distortion aberration diagram in FIG. 7D shows that the distortion aberration of the first embodiment is maintained within the range of ±35%, which indicates that the distortion aberration of the first embodiment meets imaging quality requirements of the optical system. Compared with the existing optical lens, the first embodiment can still provide good imaging quality under the condition that the system length is shortened to 1.574 mm. Therefore, the first embodiment can have a smaller size while the manufacturing tolerance is allowable. The first embodiment also simultaneously improves the manufacturing yield, has good imaging quality, and has a large field of view.

In addition, the first embodiment also has good thermal stability. For example, a normal temperature is set as 20° C., and a focal shift is 0.0000 mm at this temperature. Furthermore, a focal shift is 0.0005 mm at 0° C., and a focal shift is −0.0005 mm at 60° C.

Figure 10:
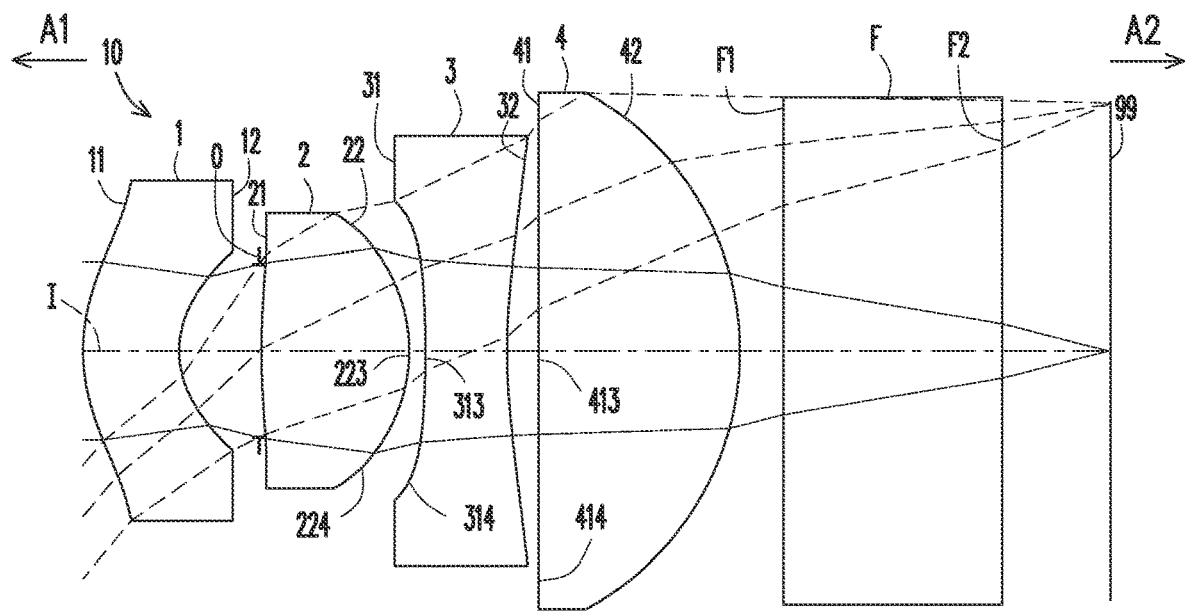
FIG. 10 is a schematic diagram of an optical imaging lens of a second embodiment of the disclosure.

FIG. 10 is a schematic diagram of an optical imaging lens of a second embodiment of the disclosure. FIG. 11A to FIG. 11D are diagrams of longitudinal spherical aberration and various aberrations of an optical imaging lens of a second embodiment. Please refer to FIG. 10 first. The optical imaging lens 10 of the second embodiment of the disclosure is substantially similar to the first embodiment, and the differences between the two are as follows: various optical data, aspheric coefficients, and parameters between the lens elements 1, 2, 3, and 4 are more or less different. In addition, in this embodiment, the material of the second lens element 2 may be plastic, the optical axis region 223 of the image-side surface 22 of the second lens element 2 is convex, and the periphery region 224 thereof is convex. The object-side surface 21 and the image-side surface 22 of the second lens element 2 are both aspheric surfaces. The optical axis region 313 of the object-side surface 31 of the third lens element 3 is concave, and the periphery region 314 thereof is concave. The material of the fourth lens element 4 may be glass, the optical axis region 413 of the object-side surface 41 of the fourth lens element 4 is plane, and the periphery region 414 thereof is plane. The image-side surface 42 of the fourth lens element 4 is a spherical surface. It should be noted here that in order to clearly show the drawing, the reference numerals of the optical axis regions and the periphery regions similar to the first embodiment are omitted in FIG. 10.

The detailed optical data of the optical imaging lens 10 of the second embodiment is shown in FIG. 12, and the effective focal length of the optical imaging lens 10 of the second embodiment is 0.657 mm, the half field of view (HFOV) is 50.000 degrees, the F-number (Fno) is 2.000, the system length is 1.882 mm, and the image height is 0.452 mm.

Various aspheric coefficients of the object-side surface 11 of the first lens element 1 to the image-side surface 32 of the third lens element 3 of the second embodiment in Equation (1) are shown in FIG. 13.

In addition, the relationship between important parameters in the optical imaging lens 10 of the second embodiment is shown in FIG. 46.

Figures 11A, 11B, 11C, 11D:
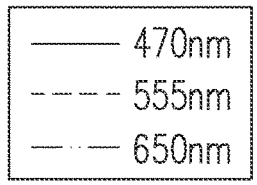
FIG. 11A to FIG. 11D are diagrams of longitudinal spherical aberration and various aberrations of an optical imaging lens of a second embodiment.

The longitudinal spherical aberration of the second embodiment is shown in FIG. 11A, and the deviation of an imaging point of off-axis rays at different heights is controlled within the range of ±7 μm. In the two field curvature aberration diagrams of FIG. 11B and FIG. 11C, the focal length variation of the three representative wavelengths within the entire field of view falls within ±20 μm. The distortion aberration diagram of FIG. 11D shows that the distortion aberration of the second embodiment is maintained within the range of ±45%.

The second embodiment also has good thermal stability. For example, the normal temperature is set as 20° C., and the focal shift is 0.0000 mm at this temperature. Furthermore, the focal shift is −0.0005 mm at 0° C., and the focal shift is 0.0020 mm at 60° C.

It can be known from the above description that the longitudinal spherical aberration and the field curvature aberration of the second embodiment surpass the first embodiment.

Figure 14:
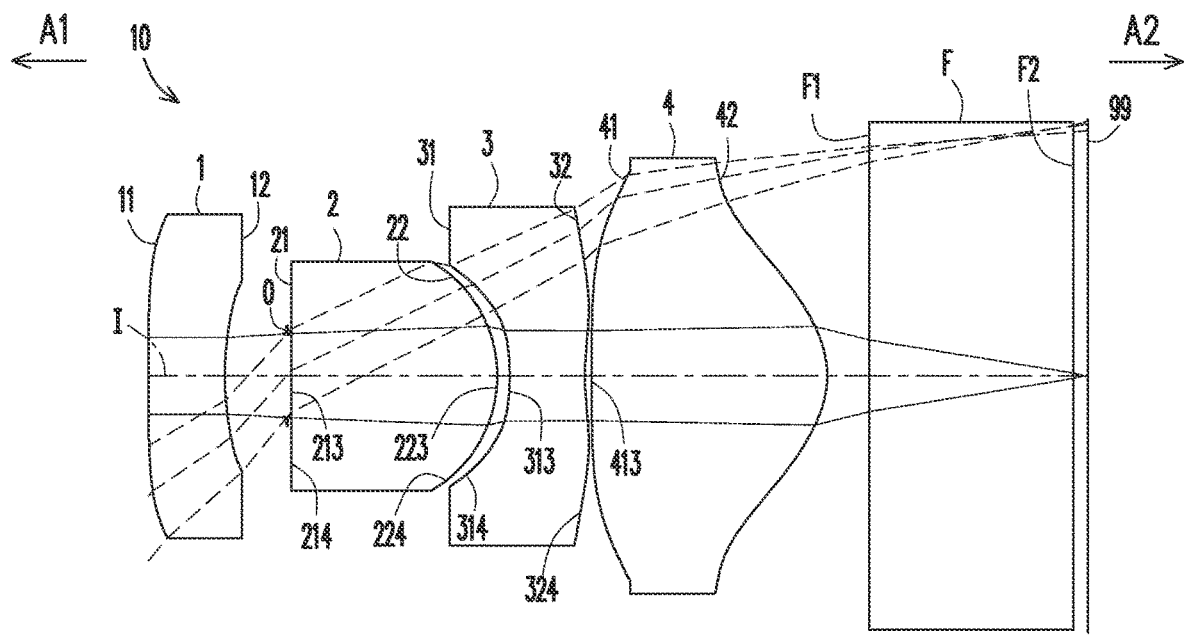
FIG. 14 is a schematic diagram of an optical imaging lens of a third embodiment of the disclosure.

FIG. 14 is a schematic diagram of an optical imaging lens of a third embodiment of the disclosure. FIG. 15A to FIG. 15D are diagrams of longitudinal spherical aberration and various aberrations of an optical imaging lens of a third embodiment. Please refer to FIG. 14 first. The optical imaging lens 10 of the third embodiment of the disclosure is substantially similar to the first embodiment, and the differences between the two are as follows: various optical data, aspheric coefficients, and parameters between the lens elements 1, 2, 3, and 4 are more or less different. In addition, in this embodiment, the optical axis region 213 of the object-side surface 21 of the second lens element 2 is plane, and the periphery region 214 thereof is plane. The optical axis region 223 of the image-side surface 22 of the second lens element 2 is convex, and the periphery region 224 thereof is convex. The image-side surface 22 of the second lens element 2 is a spherical surface. The optical axis region 313 of the object-side surface 31 of the third lens element 3 is concave, and the periphery region 314 thereof is concave. The periphery region 324 of the image-side surface 32 of the third lens element 3 is convex. The optical axis region 413 of the object-side surface 41 of the fourth lens element 4 is concave. It should be noted here that in order to clearly show the drawing, the reference numerals of the optical axis regions and the periphery regions similar to the first embodiment are omitted in FIG. 14.

The detailed optical data of the optical imaging lens 10 of the third embodiment is shown in FIG. 16, and the effective focal length of the optical imaging lens 10 of the third embodiment is 0.295 mm, the half field of view (HFOV) is 50.000 degrees, the F-number (Fno) is 2.000, the system length is 1.837 mm, and the image height is 0.494 mm.

Various aspheric coefficients of the object-side surface 11 of the first lens element 1 to the image-side surface 42 of the fourth lens element 4 of the third embodiment in Equation (1) are shown in FIG. 17.

In addition, the relationship between important parameters in the optical imaging lens 10 of the third embodiment is shown in FIG. 46.

Figures 15A, 15B, 15C, 15D:
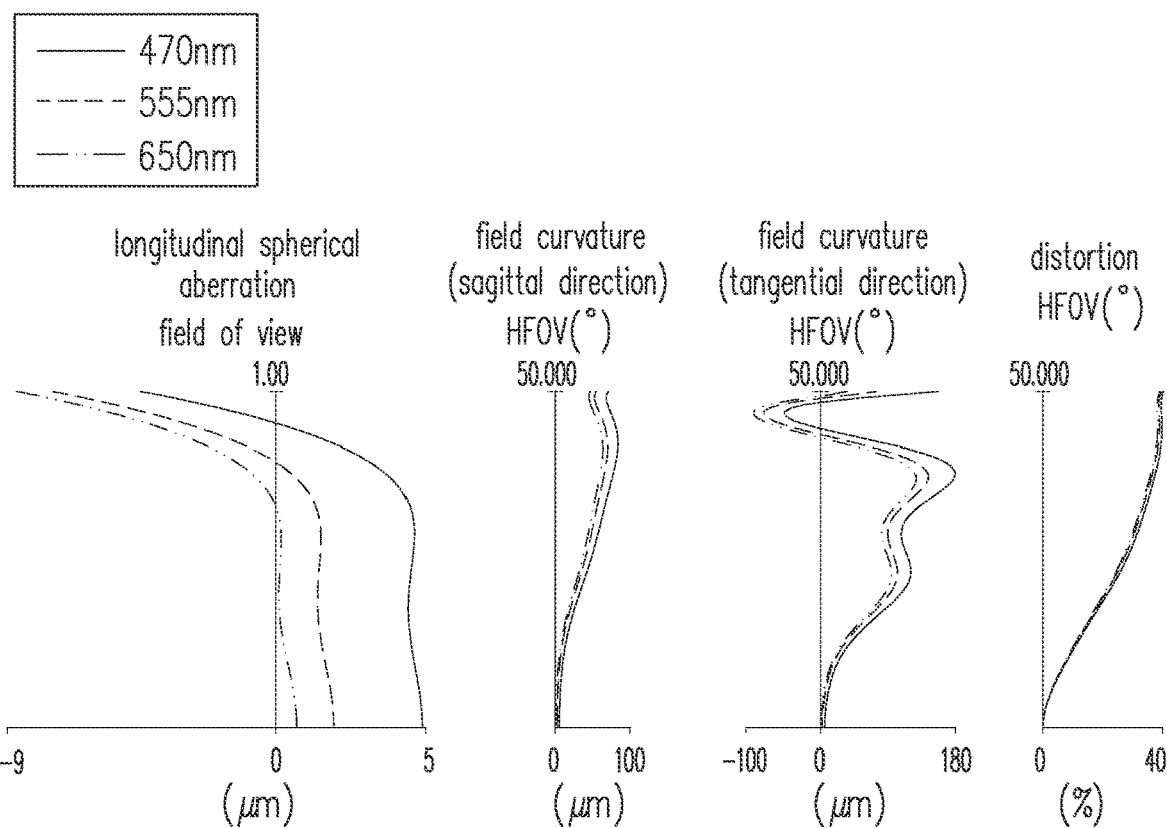
FIG. 15A to FIG. 15D are diagrams of longitudinal spherical aberration and various aberrations of an optical imaging lens of a third embodiment.

The longitudinal spherical aberration of the third embodiment is shown in FIG. 15A, and the deviation of an imaging point of off-axis rays at different heights is controlled within the range of ±9 μm. In the two field curvature aberration diagrams of FIG. 15B and FIG. 15C, the focal length variation of the three representative wavelengths within the entire field of view falls within ±180 μm. The distortion aberration diagram of FIG. 15D shows that the distortion aberration of the third embodiment is maintained within the range of ±40%.

The third embodiment also has good thermal stability. For example, the normal temperature is set as 20° C., and the focal shift is 0.0000 mm at this temperature. Furthermore, the focal shift is 0.0005 mm at 0° C., and the focal shift is −0.0010 mm at 60° C.

It can be known from the above description that the longitudinal spherical aberration of the third embodiment surpasses the first embodiment.

FIG. 18 is a schematic diagram of an optical imaging lens of a fourth embodiment of the disclosure. FIG. 19A to FIG. 19D are diagrams of longitudinal spherical aberration and various aberrations of an optical imaging lens of a fourth embodiment. Please refer to FIG. 18 first. The optical imaging lens 10A of the fourth embodiment of the disclosure is substantially similar to the first embodiment, and the differences between the two are as follows: various optical data, aspheric coefficients, and parameters between the lens elements 1, 2, 3, and 4 are more or less different. In addition, in this embodiment, the optical axis region 213 of the object-side surface 21 of the second lens element 2 is plane, and the periphery region 214 thereof is plane. The optical axis region 223 of the image-side surface 22 of the second lens element 2 is convex, and the periphery region 224 thereof is convex. The image-side surface 22 of the second lens element 2 is a spherical surface. The optical axis region 313 of the object-side surface 31 of the third lens element 3 is concave, and the periphery region 314 thereof is concave. The periphery region 324 of the image-side surface 32 of the third lens element 3 is convex. It should be noted here that in order to clearly show the drawing, the reference numerals of the optical axis regions and the periphery regions similar to the first embodiment are omitted in FIG. 18.

The detailed optical data of the optical imaging lens 10 of the fourth embodiment is shown in FIG. 20, and the effective focal length of the optical imaging lens 10 of the fourth embodiment is 0.615 mm, the half field of view (HFOV) is 45.000 degrees, the F-number (Fno) is 1.800, the system length is 2.978 mm, and the image height is 0.504 mm.

Various aspheric coefficients of the object-side surface 11 of the first lens element 1 to the image-side surface 42 of the fourth lens element 4 of the fourth embodiment in Equation (1) are shown in FIG. 21.

In addition, the relationship between important parameters in the optical imaging lens 10 of the fourth embodiment is shown in FIG. 46.

The longitudinal spherical aberration of the fourth embodiment is shown in FIG. 19A, and the deviation of an imaging point of off-axis rays at different heights is controlled within the range of ±25 μm. In the two field curvature aberration diagrams of FIG. 19B and FIG. 19C, the focal length variation of the three representative wavelengths within the entire field of view falls within ±50 μm. The distortion aberration diagram of FIG. 19D shows that the distortion aberration of the fourth embodiment is maintained within the range of ±18%.

The fourth embodiment also has good thermal stability. For example, the normal temperature is set as 20° C., and the focal shift is 0.0000 mm at this temperature. Furthermore, the focal shift is 0.0035 mm at 0° C., and the focal shift is −0.0060 mm at 60° C.

It can be known from the above description that the F-number of the fourth embodiment is smaller than the F-number of the first embodiment. In addition, the distortion aberration of the fourth embodiment surpasses the first embodiment.

FIG. 22 is a schematic diagram of an optical imaging lens of a fifth embodiment of the disclosure. FIG. 23A to FIG. 23D are diagrams of longitudinal spherical aberration and various aberrations of an optical imaging lens of a fifth embodiment. Please refer to FIG. 22 first. The optical imaging lens 10 of the fifth embodiment of the disclosure is substantially similar to the first embodiment, and the differences between the two are as follows: various optical data, aspheric coefficients, and parameters between the lens elements 1, 2, 3, and 4 are more or less different. In addition, in this embodiment, the optical axis region 213 of the object-side surface 21 of the second lens element 2 is plane, and the periphery region 214 thereof is plane. The optical axis region 223 of the image-side surface 22 of the second lens element 2 is convex, and the periphery region 224 thereof is convex. The image-side surface 22 of the second lens element 2 is a spherical surface. The optical axis region 313 of the object-side surface 31 of the third lens element 3 is concave, and the periphery region 314 thereof is concave. It should be noted here that in order to clearly show the drawing, the reference numerals of the optical axis regions and the periphery regions similar to the first embodiment are omitted in FIG. 22.

The detailed optical data of the optical imaging lens 10 of the fifth embodiment is shown in FIG. 24, and the effective focal length of the optical imaging lens 10 of the fifth embodiment is 0.511 mm, the half field of view (HFOV) is 50.000 degrees, the F-number (Fno) is 2.000, the system length is 2.276 mm, and the image height is 0.500 mm.

Various aspheric coefficients of the object-side surface 11 of the first lens element 1 to the image-side surface 42 of the fourth lens element 4 of the fifth embodiment Equation (1) are shown in FIG. 25.

In addition, the relationship between important parameters in the optical imaging lens 10 of the fifth embodiment is shown in FIG. 46.

The longitudinal spherical aberration of the fifth embodiment is shown in FIG. 23A, and the deviation of an imaging point of off-axis rays at different heights is controlled within the range of ±6 μm. In the two field curvature aberration diagrams of FIG. 23B and FIG. 23C, the focal length variation of the three representative wavelengths within the entire field of view falls within ±25 μm. The distortion aberration diagram of FIG. 23D shows that the distortion aberration of the fifth embodiment is maintained within the range of ±18%.

The fifth embodiment also has good thermal stability. For example, the normal temperature is set as 20° C., and the focal shift is 0.0000 mm at this temperature. Furthermore, the focal shift is 0.0020 mm at 0° C., and the focal shift is −0.0045 mm at 60° C.

It can be known from the above description that the longitudinal spherical aberration, the field curvature aberration, and the distortion aberration of the fifth embodiment surpass the first embodiment.

FIG. 26 is a schematic diagram of an optical imaging lens of a sixth embodiment of the disclosure. FIG. 27A to FIG. 27D are diagrams of longitudinal spherical aberration and various aberrations of an optical imaging lens of a sixth embodiment. Please refer to FIG. 26 first. The optical imaging lens 10 of the sixth embodiment of the disclosure is substantially similar to the first embodiment, and the differences between the two are as follows: various optical data, aspheric coefficients, and parameters between the lens elements 1, 2, 3, and 4 are more or less different. In addition, in this embodiment, the periphery region 114 of the object-side surface 11 of the first lens element 1 is concave. The optical axis region 213 of the object-side surface 21 of the second lens element 2 is concave, and the periphery region 214 thereof is concave. The optical axis region 223 of the image-side surface 22 of the second lens element 2 is convex, and the periphery region 224 thereof is convex. The image-side surface 22 of the second lens element 2 is a spherical surface. The periphery region 314 of the object-side surface 31 of the third lens element 3 is concave, and the periphery region 324 of the image-side surface 32 thereof is convex. It should be noted here that in order to clearly show the drawing, the reference numerals of the optical axis regions and the periphery regions similar to the first embodiment are omitted in FIG. 26.

The detailed optical data of the optical imaging lens 10 of the sixth embodiment is shown in FIG. 28, and the effective focal length of the optical imaging lens 10 of the sixth embodiment is 0.601 mm, the half field of view (HFOV) is 50.000 degrees, the F-number (Fno) is 2.000, the system length is 1.702 mm, and the image height is 0.445 mm.

Various aspheric coefficients of the object-side surface 11 of the first lens element 1 to the image-side surface 42 of the fourth lens element 4 of the sixth embodiment in Equation (1) are shown in FIG. 29.

In addition, the relationship between important parameters in the optical imaging lens 10 of the sixth embodiment is shown in FIG. 47, where the unit of HFOV is degrees, Fno has no unit, and the unit of the remaining parameters is millimeter.

The longitudinal spherical aberration of the sixth embodiment is shown in FIG. 27A, and the deviation of an imaging point of off-axis rays at different heights is controlled within the range of ±30 µm. In the two field curvature aberration diagrams of FIG. 27B and FIG. 27C, the focal length variation of the three representative wavelengths within the entire field of view falls within ±60 µm. The distortion aberration diagram of FIG. 27D shows that the distortion aberration of the sixth embodiment is maintained within the range of ±40%.

The sixth embodiment also has good thermal stability. For example, the normal temperature is set as 20° C., and the focal shift is 0.0000 mm at this temperature. Furthermore, the focal shift is 0.0000 mm at 0° C., and the focal shift is −0.0005 mm at 60° C.

It can be known from the above description that the thickness difference between the optical axis of the lens and the periphery region of the sixth embodiment is smaller than that of the first embodiment. Therefore, the optical imaging lens of the sixth embodiment is easier to manufacture and thus has higher yield than the first embodiment.

FIG. 30 is a schematic diagram of an optical imaging lens of a seventh embodiment of the disclosure. FIG. 31A to FIG. 31D are diagrams of longitudinal spherical aberration and various aberrations of an optical imaging lens of a seventh embodiment. Please refer to FIG. 30 first. The optical imaging lens 10 of the seventh embodiment of the disclosure is substantially similar to the first embodiment, and the differences between the two are as follows: various optical data, aspheric coefficients, and parameters between the lens elements 1, 2, 3, and 4 are more or less different. In addition, in this embodiment, the optical axis region 213 of the object-side surface 21 of the second lens element 2 is plane, and the periphery region 214 thereof is plane. The optical axis region 223 of the image-side surface 22 of the second lens element 2 is convex, and the periphery region 224 thereof is convex. The image-side surface 22 of the second lens element 2 is a spherical surface. The periphery region 314 of the object-side surface 31 of the third lens element 3 is concave, and the periphery region 324 of the image-side surface 32 thereof is convex. The periphery region 414 of the object-side surface 41 of the fourth lens element 4 is concave. It should be noted here that in order to clearly show the drawing, the reference numerals of the optical axis regions and the periphery regions similar to the first embodiment are omitted in FIG. 30.

The detailed optical data of the optical imaging lens 10 of the seventh embodiment is shown in FIG. 32, and the effective focal length of the optical imaging lens 10 of the seventh embodiment is 0.481 mm, the half field of view (HFOV) is 50.000 degrees, the F-number (Fno) is 2.000, the system length is 1.599 mm, and the image height is 0.440 mm.

Various aspheric coefficients of the object-side surface 11 of the first lens element 1 to the image-side surface 42 of the fourth lens element 4 of the seventh embodiment in Equation (1) are shown in FIG. 33.

In addition, the relationship between the important parameters in the optical imaging lens 10 of the seventh embodiment is shown in FIG. 47.

The longitudinal spherical aberration of the seventh embodiment is shown in FIG. 31A, and the deviation of an imaging point of off-axis rays at different heights is controlled within the range of ±12 µm. In the two field curvature aberration diagrams of FIG. 31B and FIG. 31C, the focal length variation of the three representative wavelengths within the entire field of view falls within ±25 µm. The distortion aberration diagram of FIG. 31D shows that the distortion aberration of the seventh embodiment is maintained within the range of ±25%.

The seventh embodiment also has good thermal stability. For example, the normal temperature is set as 20° C., and the focal shift is 0.0000 mm at this temperature. Furthermore, the focal shift is 0.0030 mm at 0° C., and the focal shift is −0.0065 mm at 60° C.

It can be known from the above description that the longitudinal spherical aberration, the field curvature aberration, and the distortion aberration of the seventh embodiment surpass the first embodiment.

FIG. 34 is a schematic diagram of an optical imaging lens of an eighth embodiment of the disclosure. FIG. 35A to FIG. 35D are diagrams of longitudinal spherical aberration and various aberrations of an optical imaging lens of an eighth embodiment. Please refer to FIG. 34 first. The optical imaging lens 10 of the eighth embodiment of the disclosure is substantially similar to the first embodiment, and the differences between the two are as follows: various optical data, aspheric coefficients, and parameters between the lens elements 1, 2, 3, and 4 are more or less different. In addition, in this embodiment, the optical axis region 213 of the object-side surface 21 of the second lens element 2 is plane, and the periphery region 214 thereof is plane. The optical axis region 223 of the image-side surface 22 of the second lens element 2 is convex, and the periphery region 224 thereof is convex. The image-side surface 22 of the second lens element 2 is a spherical surface. The periphery region 314 of the object-side surface 31 of the third lens element 3 is concave. It should be noted here that in order to clearly show the drawing, the reference numerals of the optical axis regions and the periphery regions similar to the first embodiment are omitted in FIG. 34.

The detailed optical data of the optical imaging lens 10 of the eighth embodiment is shown in FIG. 36, and the effective focal length of the optical imaging lens 10 of the eighth embodiment is 0.473 mm, the half field of view (HFOV) is 50.000 degrees, the F-number (Fno) is 2.000, the system length is 1.673 mm, and the image height is 0.440 mm.

Various aspheric coefficients of the object-side surface 11 of the first lens element 1 to the image-side surface 42 of the fourth lens element 4 of the eighth embodiment in Equation (1) are shown in FIG. 37.

In addition, the relationship between important parameters in the optical imaging lens 10 of the eighth embodiment is shown in FIG. 47.

The longitudinal spherical aberration of the eighth embodiment is shown in FIG. 35A, and the deviation of an imaging point of off-axis rays at different heights is controlled within the range of ±2 μm. In the two field curvature aberration diagrams of FIG. 35B and FIG. 35C, the focal length variation of the three representative wavelengths within the entire field of view falls within ±18 μm. The distortion aberration diagram of FIG. 35D shows that the distortion aberration of the eighth embodiment is maintained within the range of ±25%.

The eighth embodiment also has good thermal stability. For example, the normal temperature is set as 20° C., and the focal shift is 0.0000 mm at this temperature. Furthermore, the focal shift is 0.0015 mm at 0° C., and the focal shift is −0.0035 mm at 60° C.

It can be known from the above description that the longitudinal spherical aberration, the field curvature aberration, and the distortion aberration of the eighth embodiment surpass the first embodiment.

FIG. 38 is a schematic diagram of an optical imaging lens of a ninth embodiment of the disclosure. FIG. 39A to FIG. 39D are diagrams of longitudinal spherical aberration and various aberrations of an optical imaging lens of a ninth embodiment. Please refer to FIG. 38 first. The optical imaging lens 10 of the ninth embodiment of the disclosure is substantially similar to the first embodiment, and the differences between the two are as follows: various optical data, aspheric coefficients, and parameters between the lens elements 1, 2, 3, and 4 are more or less different. In addition, in this embodiment, the optical axis region 213 of the object-side surface 21 of the second lens element 2 is plane, and the periphery region 214 thereof is plane. The optical axis region 223 of the image-side surface 22 of the second lens element 2 is convex, and the periphery region 224 thereof is convex. The image-side surface 22 of the second lens element 2 is a spherical surface. The optical axis region 313 of the object-side surface 31 of the third lens element 3 is concave, and the periphery region 314 thereof is concave. The periphery region 324 of the image-side surface 32 of the third lens element 3 is convex. It should be noted here that in order to clearly show the drawing, the reference numerals of the optical axis regions and the periphery regions similar to the first embodiment are omitted in FIG. 38.

The detailed optical data of the optical imaging lens 10 of the ninth embodiment is shown in FIG. 40, and the effective focal length of the optical imaging lens 10 of the ninth embodiment is 0.557 mm, the half field of view (HFOV) is 50.000 degrees, the F-number (Fno) is 2.000, the system length is 1.702 mm, and the image height is 0.439 mm.

Various aspheric coefficients of the object-side surface 11 of the first lens element 1 to the image-side surface 42 of the fourth lens element 4 of the ninth embodiment in Equation (1) are shown in FIG. 41.

In addition, the relationship among the important parameters in the optical imaging lens 10 of the ninth embodiment is shown in FIG. 47.

The longitudinal spherical aberration of the ninth embodiment is shown in FIG. 39A, and the deviation of an imaging point of off-axis rays at different heights is controlled within the range of ±18 μm. In the two field curvature aberration diagrams of FIG. 39B and FIG. 39C, the focal length variation of the three representative wavelengths within the entire field of view falls within ±25 μm. The distortion aberration diagram of FIG. 39D shows that the distortion aberration of the ninth embodiment is maintained within the range of ±35%.

The ninth embodiment also has good thermal stability. For example, the normal temperature is set as 20° C., and the focal shift is 0.0000 mm at this temperature. Furthermore, the focal shift is 0.0030 mm at 0° C., and the focal shift is −0.0055 mm at 60° C.

It can be known from the above description that the field curvature aberration of the ninth embodiment surpasses the first embodiment.

FIG. 42 is a schematic diagram of an optical imaging lens of a tenth embodiment of the disclosure. FIG. 43A to FIG. 43D are diagrams of longitudinal spherical aberration and various aberrations of an optical imaging lens of a tenth embodiment. Please refer to FIG. 42 first. The optical imaging lens 10 of the tenth embodiment of the disclosure is substantially similar to the first embodiment, and the differences between the two are as follows: various optical data, aspheric coefficients, and parameters between the lens elements 1, 2, 3, and 4 are more or less different. In addition, in this embodiment, the optical axis region 223 of the image-side surface 22 of the second lens element 2 is convex, and the periphery region 224 thereof is convex. The image-side surface 22 of the second lens element 2 is a spherical surface. The optical axis region 313 of the object-side surface 31 of the third lens element 3 is concave, and the periphery region 314 thereof is concave. The optical axis region 323 of the image-side surface 32 of the third lens element 3 is convex, and the periphery region 324 thereof is convex. The optical axis region 413 of the object-side surface 41 of the fourth lens element 4 is concave. It should be noted here that in order to clearly show the drawing, the reference numerals of the optical axis regions and the periphery regions similar to the first embodiment are omitted in FIG. 42.

The detailed optical data of the optical imaging lens 10 of the tenth embodiment is shown in FIG. 44, and the effective focal length of the optical imaging lens 10 of the tenth embodiment is 0.509 mm, the half field of view (HFOV) is 50.000 degrees, the F-number (Fno) is 2.000, the system length is 1.663 mm, and the image height is 0.414 mm.

Various aspheric coefficients of the object-side surface 11 of the first lens element 1 to the image-side surface 42 of the fourth lens element 4 of the tenth embodiment in Equation (1) are shown in FIG. 45.

In addition, the relationship among the important parameters in the optical imaging lens 10 of the tenth embodiment is shown in FIG. 47.

The longitudinal spherical aberration of the tenth embodiment is shown in FIG. 43A, and the deviation of an imaging point of off-axis rays at different heights is controlled within the range of ±45 μm. In the two field curvature aberration diagrams of FIG. 43B and FIG. 43C, the focal length variation of the three representative wavelengths within the entire field of view falls within ±45 μm. The distortion aberration diagram of FIG. 43D shows that the distortion aberration of the tenth embodiment is maintained within the range of ±35%.

The tenth embodiment also has good thermal stability. For example, the normal temperature is set as 20° C., and the focal shift is 0.0000 mm at this temperature. Furthermore, the focal shift is 0.0035 mm at 0° C., and the focal shift is −0.0070 mm at 60° C.

Please refer to FIG. 46 to FIG. 49. FIG. 46 to FIG. 49 are tables of various optical parameters of the first embodiment to the tenth embodiment.

In addition, when the material of the lens element of the optical imaging lens 10 meets the following configuration relationships, it effectively improves the chromatic aberration.

In the optical imaging lens 10 of the embodiment of the disclosure, the following conditional expression is met: (V1+V2+V3)/V4≤3.000. Specifically, the preferred range is 1.700≤(V1+V2+V3)/V4≤3.000.

When the optical imaging lens 10 meets the following configuration relationships, the field of view can be enlarged, the system length can be shortened, and the F-number can be reduced to increase the luminous flux.

The optical imaging lens 10 of the embodiment of the disclosure further satisfies the following conditional expression: HFOV/(TL*Fno)≥15.000 degrees/mm, where the preferred range is 15.000 degrees/mm≤HFOV/(TL*Fno) ≤30.000 degrees/mm.

When the optical imaging lens 10 meets the following configuration relationships, the image height can be increased, and the imaging quality and manufacturing yield can be improved.

The optical imaging lens 10 of the embodiment of the disclosure further satisfies the following conditional expression: ImgH/(G12+G23)≥2.400, where the preferred range is 2.400≤ImgH/(G12+G23)≤5.000.

Furthermore, in order to shorten the system length of the optical imaging lens 10, the air gap between the lens elements or the thickness of the lens elements can be adjusted appropriately. However, the difficulty of production and the quality of imaging must be considered at the same time. Therefore, if the numerical limits of the following conditional expressions are satisfied, it is possible for the embodiment of the disclosure to have a better configuration.

The optical imaging lens 10 of the embodiment of the disclosure further satisfies the following conditional expression: ALT/(T2+G23)≥2.600, where the preferred range is 2.600≤ALT/(T2+G23)≤5.000.

The optical imaging lens 10 of the embodiment of the disclosure further satisfies the following conditional expression: BFL/(T3+G34)≥2.000, where the preferred range is 2.000≤BFL/(T3+G34)≤5.500.

The optical imaging lens 10 of the embodiment of the disclosure further satisfies the following conditional expression: TL/(EFL+AAG)≥1.200, where the preferred range is 1.200≤TL/(EFL+AAG)≤4.000.

The optical imaging lens 10 of the embodiment of the disclosure further satisfies the following conditional expression: (G12+T4)/T3≥2.500, where the preferred range is 2.500≤(G12+T4)/T3≤6.000.

The optical imaging lens 10 of the embodiment of the disclosure further satisfies the following conditional expression: (EFL+T4)/(G12+G23)≥4.900, where the preferred range is 4.900≤(EFL+T4)/(G12+G23)≤10.500.

The optical imaging lens 10 of the embodiment of the disclosure further satisfies the following conditional expression: T4/T1≥2.000, where the preferred range is 2.000≤T4/T1≤9.000.

The optical imaging lens 10 of the embodiment of the disclosure further satisfies the following conditional expression: (T2+T3+T4)/EFL≥1.000, where the preferred range is 1.000≤(T2+T3+T4)/EFL≤6.000.

The optical imaging lens 10 of the embodiment of the disclosure further satisfies the following conditional expression: BFL/AAG≥2.400, where the preferred range is 2.400≤BFL/AAG≤7.800.

The optical imaging lens 10 of the embodiment of the disclosure further satisfies the following conditional expression: T4/G12≤4.500, where the preferred range is 2.200≤T4/G12≤4.500.

The optical imaging lens 10 of the embodiment of the disclosure further satisfies the following conditional expression: TTL/(G12+T2+T4)≤2.800, where the preferred range is 1.500≤TTL/(G12+T2+T4)≤2.800.

The optical imaging lens 10 of the embodiment of the disclosure further satisfies the following conditional expression: (T3+BFL)/T4≤2.300, where the preferred range is 1.000≤(T3+BFL)/T4≤2.300.

The optical imaging lens 10 of the embodiment of the disclosure further satisfies the following conditional expression: (T2+T4)/T3≥3.500, where the preferred range is 3.500≤(T2+T4)/T3≤6.800.

The optical imaging lens 10 of the embodiment of the disclosure further satisfies the following conditional expression: G12/(G23+G34)≥1.500, where the preferred range is 1.500≤G12/(G23+G34)≤9.000.

The optical imaging lens 10 of the embodiment of the disclosure further satisfies the following conditional expression: T2/G12≤3.100, where the preferred range is 1.500≤T2/G12≤3.100.

The above exemplary limitation relational expressions may also be selectively incorporated in varying amounts to be applied to the embodiments of the disclosure and are not limited thereto. During the implementation of the disclosure, in addition to the above relational expressions, detailed structures such as the concave-convex curved surface arrangement of other lens elements may also be additionally designed for a single lens element or broadly for multiple lens elements to enhance the control of system performance and/or resolution. It should be noted that the details need to be selectively incorporated in other embodiments of the disclosure without conflict.

In summary, the optical imaging lens 10 of the embodiments of the disclosure may achieve the following effects and merits:

1. The longitudinal spherical aberrations, field curvature aberrations, and distortions of various embodiment of the disclosure all comply with usage specifications. In addition, the off-axis rays at different heights of the three red, green, and blue representative wavelengths are all concentrated near the imaging point. It can be seen from the skewness of each curve that the deviation of the imaging point of the off-axis rays at different heights is controlled to have good spherical aberration, aberration, and distortion suppression capabilities. Further referring to imaging quality data, the distances between the three red, green, and blue representative wavelengths are also fairly close to each other, which shows that the disclosure has good concentration of rays with different wavelengths under various states and has excellent chromatic dispersion suppression capability. In summary, the disclosure can produce excellent imaging quality by the design and mutual matching of the lens elements.

2. The optical imaging lens of the embodiments of the disclosure satisfies the following combinations, which is beneficial to simultaneously reducing the lens volume and expanding the field of view: the optical axis region of the object-side surface of the first lens element is designed to be convex, and together with HFOV/TTL≥15.000 degrees/mm, where the preferable range is 15.000 degrees/mm≤HFOV/TTL≤35.000 degrees/mm. When the third lens element is designed to have negative refracting power, and the optical axis region of the image-side surface of the fourth lens element is designed to be convex, the aberration of the optical system can be effectively corrected and the distortion can be effectively reduced. When the second lens element is designed to be a glass lens element, the thermal stability of the optical imaging lens can be increased. Furthermore, when the size of glass lens element of the optical imaging lens is designed to be satisfied 0.500≤|RLGmin|/TG, the manufacturing yield of the compact lens is improved and the optical imaging lens has good imaging quality, wherein a preferred range of 0.500≤|RLGmin|≤3.500.

3. The optical imaging lens of the embodiments of the disclosure satisfies the following combinations, which is beneficial to simultaneously reducing the lens volume and expanding the field of view: the first lens element has negative refracting power, the optical axis region of the object-side surface of the first lens element is convex, and together with HFOV/TTL≥15.000 degrees/mm, where the preferable range is 15.000 degrees/mm≤HFOV/TTL≤35.000 degrees/mm. When the third lens element is designed to have negative refracting power, the aberration of the optical system can be effectively corrected. When the second lens element is designed to have positive refracting power, or the fourth lens element is designed to have positive refracting power, the distortion can be reduced. When the second lens element is designed to be a glass lens element, the thermal stability of the optical imaging lens can be increased. Furthermore, when the size of glass lens element of the optical imaging lens is designed to be satisfied 0.500≤|RLGmin|/TG, the manufacturing yield of the compact lens is improved and the optical imaging lens has good imaging quality, wherein a preferred range of 0.500≤|RLGmin|/TG≤3.500.

4. The optical imaging lens of the embodiments of the disclosure satisfies the following combinations, which is beneficial to simultaneously reducing the lens volume and expanding the field of view: the optical axis region of the object-side surface of the first lens element is designed to be convex, and together with HFOV/TTL≥15.000 degrees/mm, where the preferable range is 15.000 degrees/mm≤HFOV/TTL≤35.000 degrees/mm. When the periphery region of the object-side surface of the third lens element is designed to be concave, the edge aberration of the optical imaging lens can be corrected. When the second lens element is designed to be a glass lens element, the thermal stability of the optical imaging lens can be increased. When the size of glass lens element of the optical imaging lens is designed to be satisfied 0.500≤|RLGmin|/TG, the manufacturing yield of the compact lens is improved and the optical imaging lens has good imaging quality, wherein a preferred range of 0.500≤|RLGmin|/TG≤3.500. Furthermore, when the first lens element is designed to have negative refracting power, or the second lens element is designed to have positive refracting power, the F-number of the optical imaging lens is effectively decreased and the luminous flux is effectively increased. In addition, when the periphery region of the object-side surface of the fourth lens element is designed to be concave, the aberration at large field of view can be corrected.

5. The optical imaging lens of the embodiments of the disclosure satisfies the following combinations, which is beneficial to simultaneously reducing the lens volume and expanding the field of view: the optical axis region of the object-side surface of the first lens element is designed to be convex, and together with HFOV/TTL≥15.000 degrees/mm, where the preferable range is 15.000 degrees/mm≤HFOV/TTL≤35.000 degrees/mm. When the periphery region of the image-side surface of the first lens element is designed to be concave, the edge aberration of the optical imaging lens can be corrected. When the second lens element is designed to be a glass lens element, the thermal stability of the optical imaging lens can be increased. When the size of glass lens element of the optical imaging lens is designed to be satisfied 0.500≤|RLGmin|/TG, the manufacturing yield of the compact lens is improved and the optical imaging lens has good imaging quality, wherein a preferred range of 0.500≤|RLGmin|/TG≤3.500. When the first lens element is designed to have negative refracting power, or the second lens element is designed to have positive refracting power, the F-number of the optical imaging lens is effectively decreased and the luminous flux is effectively increased. Furthermore, when the optical axis region of the image-side surface of the third lens element is designed to be concave, the incident angle of the imaging light entering the fourth lens element can be corrected to improve the imaging quality.

6. The optical imaging lens of the embodiments of the disclosure satisfies the following combinations, which is beneficial to simultaneously improving the manufacturing yield of the compact lens and maintaining the good imaging quality of the optical imaging lens: one of the lens elements from the first lens element to the fourth lens element is glass lens element, and together with 0.500≤|RLGmin|/TG of the glass lens element, where the preferable range is 0.500≤|RLGmin|/TG≤3.500. When the optical axis region of the object-side surface of the glass lens element is designed to be plane, or the optical axis region of the image-side surface of the glass lens element is designed to be plane, the manufacturing yield of the optical imaging lens is improved. Furthermore, when one of the optical axis region of the object-side surface and the image-side surface of the glass lens element is designed to be plane, and an optical axis region of the other side surface is designed to be convex (for example, the optical axis region of the object-side surface of the glass element is plane and the optical axis region of the image-side surface thereof is convex, or the optical axis region of the object-side surface of the glass element is convex and the optical axis region of the image-side surface thereof is plane), the manufacturing yield of the optical imaging lens is effectively improved.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \leq \gamma_1$ or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be determined by the scope of the appended claims.

What is claimed is:

1. An optical imaging lens, sequentially comprising a first lens element, a second lens element, a third lens element, and a fourth lens element along an optical axis from an object side to an image side, wherein each of the first lens element to the fourth lens element comprises an object-side surface facing the object side and allowing imaging rays to pass through, and an image-side surface facing the image side and allowing the imaging rays to pass through;

an optical axis region of the object-side surface of the first lens element is convex;

the second lens element is a glass lens element;

the third lens element has negative refracting power; and an optical axis region of the image-side surface of the fourth lens element is convex; wherein lens elements of the optical imaging lens are only the four lens elements, and the optical imaging lens further satisfies the following conditional expressions: HFOV/TTL≥15.000 degrees/mm, 0.500≤|RLGmin|/TG and (V1+V2+V3)/V4≤3.000, where HFOV is a half field of view of the optical imaging lens, TTL is a distance from the object-side surface of the first lens element to an image plane on the optical axis, RLGmin is a radius of curvature of a smaller one of absolute values of radius of curvatures of the object side surface and the image side surface of the glass lens element of the optical imaging lens, TG is a thickness of the glass lens element on the optical axis, V1 is an Abbe number of the first lens element, V2 is an Abbe number of the second lens element, V3 is an Abbe number of the third lens element, and V4 is an Abbe number of the fourth lens element.

2. The optical imaging lens according to claim 1, wherein the optical imaging lens further satisfies a following conditional expression: ALT/(T2+G23)≥2.600, where ALT is a sum of thicknesses of the four lens elements from the first lens element to the fourth lens element on the optical axis, T2 is a thickness of the second lens element on the optical axis, and G23 is an air gap between the second lens element and the third lens element on the optical axis.

3. The optical imaging lens according to claim 1, wherein the optical imaging lens further satisfies a following conditional expression: BFL/(T3+G34)≥2.000, where BFL is a distance from the image-side surface of the fourth lens element to the image plane on the optical axis, T3 is a thickness of the third lens element on the optical axis, and G34 is an air gap between the third lens element and the fourth lens element on the optical axis.

4. The optical imaging lens according to claim 1, wherein the optical imaging lens further satisfies a following conditional expression: TL/(EFL+AAG)≥1.200, where TL is a distance from the object-side surface of the first lens element to the image-side surface of the fourth lens element on the optical axis, EFL is an effective focal length of the optical imaging lens, and AAG is a sum of three air gaps from the first lens element to the fourth lens element on the optical axis.

5. The optical imaging lens according to claim 1, wherein the optical imaging lens further satisfies a following conditional expression: (G12+T4)/T3≥2.500, where G12 is an air gap between the first lens element and the second lens element on the optical axis, T3 is a thickness of the third lens element on the optical axis, and T4 is a thickness of the fourth lens element on the optical axis.

6. The optical imaging lens according to claim 1, wherein the optical imaging lens further satisfies a following conditional expression: HFOV/(TL*Fno)≥15.000 degrees/mm, where TL is a distance from the object-side surface of the first lens element to the image-side surface of the fourth lens element on the optical axis, and Fno is an F-number of the optical imaging lens.

7. The optical imaging lens according to claim 1, wherein the optical imaging lens further satisfies a following conditional expression: (EFL+T4)/(G12+G23)≥4.900, where EFL is an effective focal length of the optical imaging lens, T4 is a thickness of the fourth lens element on the optical axis, G12 is an air gap between the first lens element and the second lens element on the optical axis, and G23 is an air gap between the second lens element and the third lens element on the optical axis.

8. An optical imaging lens, sequentially comprising a first lens element, a second lens element, a third lens element, and a fourth lens element along an optical axis from an object side to an image side, wherein each of the first lens element to the fourth lens element comprises an object-side surface facing the object side and allowing imaging rays to pass through, and an image-side surface facing the image side and allowing the imaging rays to pass through;
the first lens element has negative refracting power, and an optical axis region of the object-side surface of the first lens element is convex;
the second lens element is a glass lens element; and
a periphery region of the object-side surface of the third lens element is concave; wherein
lens elements of the optical imaging lens are only the four lens elements, and the optical imaging lens further satisfies the following conditional expressions: HFOV/TTL≥15.000 degrees/mm and 0.500≤|RLGmin|/TG, where HFOV is a half field of view of the optical imaging lens, TTL is a distance from the object-side surface of the first lens element to an image plane on the optical axis, RLGmin is a radius of curvature of a smaller one of absolute values of radius of curvatures of the object side surface and the image side surface of the glass lens element of the optical imaging lens, and TG is a thickness of the glass lens element on the optical axis.

9. The optical imaging lens according to claim 8, wherein the optical imaging lens further satisfies a following conditional expression: T4/T1≥2.000, where T1 is a thickness of the first lens element on the optical axis, and T4 is a thickness of the fourth lens element on the optical axis.

10. The optical imaging lens according to claim 8, wherein the optical imaging lens further satisfies a following conditional expression: (T2+T3+T4)/EFL≥1.000, where T2 is a thickness of the second lens element on the optical axis, T3 is a thickness of the third lens element on the optical axis, T4 is a thickness of the fourth lens element on the optical axis, and EFL is an effective focal length of the optical imaging lens.

11. The optical imaging lens according to claim 8, wherein the optical imaging lens further satisfies a following conditional expression: BFL/AAG≥2.400, where BFL is a distance from the image-side surface of the fourth lens element to the image plane on the optical axis, and AAG is a sum of three air gaps from the first lens element to the fourth lens element on the optical axis.

12. The optical imaging lens according to claim 8, wherein the optical imaging lens further satisfies a following conditional expression: T4/G12≤4.500, where T4 is a thickness of the fourth lens element on the optical axis, and G12 is an air gap between the first lens element and the second lens element on the optical axis.

13. The optical imaging lens according to claim 8, wherein the optical imaging lens further satisfies a following conditional expression: (V1+V2+V3)/V4≤3.000, where V1 is an Abbe number of the first lens element, V2 is an Abbe number of the second lens element, V3 is an Abbe number of the third lens element, and V4 is an Abbe number of the fourth lens element.

14. The optical imaging lens according to claim 8, wherein the optical imaging lens further satisfies a following conditional expression: TTL/(G12+T2+T4)≤2.800, where G12 is an air gap between the first lens element and the second lens element on the optical axis, T2 is a thickness of the second lens element on the optical axis, and T4 is a thickness of the fourth lens element on the optical axis.

15. An optical imaging lens, sequentially comprising a first lens element, a second lens element, a third lens element, and a fourth lens element along an optical axis from an object side to an image side, wherein each of the first lens element to the fourth lens element comprises an object-side surface facing the object side and allowing imaging rays to pass through, and an image-side surface facing the image side and allowing the imaging rays to pass through;
an optical axis region of the object-side surface of the first lens element is convex, and a periphery region of the image-side surface is concave; and
the second lens element is a glass lens element; wherein
lens elements of the optical imaging lens are only the four lens elements, and the optical imaging lens further satisfies the following conditional expressions: HFOV/TTL≥15.000 degrees/mm, 0.500≤|RLGmin|/TG and (T3+BFL)/T4≤2.300, where HFOV is a half field of view of the optical imaging lens, TTL is a distance from the object-side surface of the first lens element to an image plane on the optical axis, RLGmin is a radius of curvature of a smaller one of absolute values of radius of curvatures of the object side surface and the image side surface of the glass lens element of the optical imaging lens, TG is a thickness of the glass lens element on the optical axis, T3 is a thickness of the third lens element on the optical axis, T4 is a thickness of the fourth lens element on the optical axis, and BFL is a distance from the image-side surface of the fourth lens element to the image plane on the optical axis.

16. The optical imaging lens according to claim 15, wherein the optical imaging lens further satisfies a following conditional expression: ImgH/(G12+G23)≥2.400, where ImgH is an image height of the optical imaging lens, G12 is an air gap between the first lens element and the second lens element on the optical axis, and G23 is an air gap between the second lens element and the third lens element on the optical axis.

17. The optical imaging lens according to claim 15, wherein the optical imaging lens further satisfies a following conditional expression: (T2+T4)/T3≥3.500, where T2 is a thickness of the second lens element on the optical axis.

18. The optical imaging lens according to claim 15, wherein the optical imaging lens further satisfies a following conditional expression: G12/(G23+G34)≥1.500, where G12 is an air gap between the first lens element and the second lens element on the optical axis, G23 is an air gap between the second lens element and the third lens element on the optical axis, and G34 is an air gap between the third lens element and the fourth lens element on the optical axis.

19. The optical imaging lens according to claim 15, wherein the optical imaging lens further satisfies a following conditional expression: T2/G12≤3.100, where T2 is a thickness of the second lens element on the optical axis, and G12 is an air gap between the first lens element and the second lens element on the optical axis.

* * * * *